(12) United States Patent
Saito et al.

(10) Patent No.: US 11,543,950 B2
(45) Date of Patent: Jan. 3, 2023

(54) PARAMETER SETTING APPARATUS AND PARAMETER SETTING METHOD

(71) Applicant: YAMAHA CORPORATION, Hamamatsu (JP)

(72) Inventors: Kosuke Saito, Hamamatsu (JP); Shunichi Kamiya, Hamamatsu (JP); Arata Imai, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 59 days.

(21) Appl. No.: 17/192,297

(22) Filed: Mar. 4, 2021

(65) Prior Publication Data

US 2021/0286506 A1    Sep. 16, 2021

(30) Foreign Application Priority Data

Mar. 13, 2020   (JP) ............................. JP2020-044511

(51) Int. Cl.
*G06F 3/04847*    (2022.01)
*G06F 3/16*       (2006.01)
*G06F 13/40*      (2006.01)

(52) U.S. Cl.
CPC .......... *G06F 3/04847* (2013.01); *G06F 3/162* (2013.01); *G06F 3/167* (2013.01); *G06F 13/4022* (2013.01)

(58) Field of Classification Search
CPC ...... G06F 3/04847; G06F 3/167; G06F 3/162; G06F 13/4022
See application file for complete search history.

(56) References Cited

U.S. PATENT DOCUMENTS

2006/0045292 A1    3/2006  Ando
2006/0222189 A1*  10/2006  Terada ................... H04H 60/04
                                                    381/119

(Continued)

FOREIGN PATENT DOCUMENTS

EP    2230783 A2    9/2010
JP    2006067106 A  3/2006

OTHER PUBLICATIONS

Extended European Search Report issued in European Appln. No. 21162149.5 dated Aug. 26, 2021.

*Primary Examiner* — Nicholas Klicos
(74) *Attorney, Agent, or Firm* — Rossi, Kimms & McDowell LLP

(57) ABSTRACT

A parameter setting apparatus includes a first display device, a first operation controller, a mode operation controller configured to receive either designation of a first adjustment mode for adjusting a send level or a second adjustment mode for adjusting a first parameter other than the send level, and a processing controller. The controller includes a processor. The processor controls the first display device to display a bus selection screen on the display device, selects a bus based on an operation on the displayed selection screen, causes the first operation controller to adjust a send level of the selected bus upon the mode operation controller receiving the designation of the first adjustment mode, and causes the first operation controller to adjust the first parameter upon the mode operation controller receiving the designation of the second adjustment mode.

20 Claims, 30 Drawing Sheets

(56) References Cited

U.S. PATENT DOCUMENTS

| | | | |
|---|---|---|---|
| 2010/0246856 A1* | 9/2010 | Suzuki | G06F 3/04847 |
| | | | 381/119 |
| 2011/0069011 A1* | 3/2011 | Fujita | H04H 60/04 |
| | | | 345/172 |
| 2011/0075864 A1* | 3/2011 | Hagiwara | H04H 60/04 |
| | | | 381/119 |
| 2011/0130200 A1* | 6/2011 | Terada | H04H 60/04 |
| | | | 463/31 |
| 2012/0237038 A1* | 9/2012 | Hagiwara | H04H 60/04 |
| | | | 381/17 |
| 2014/0281984 A1* | 9/2014 | Milne | G06F 3/048 |
| | | | 715/716 |

* cited by examiner

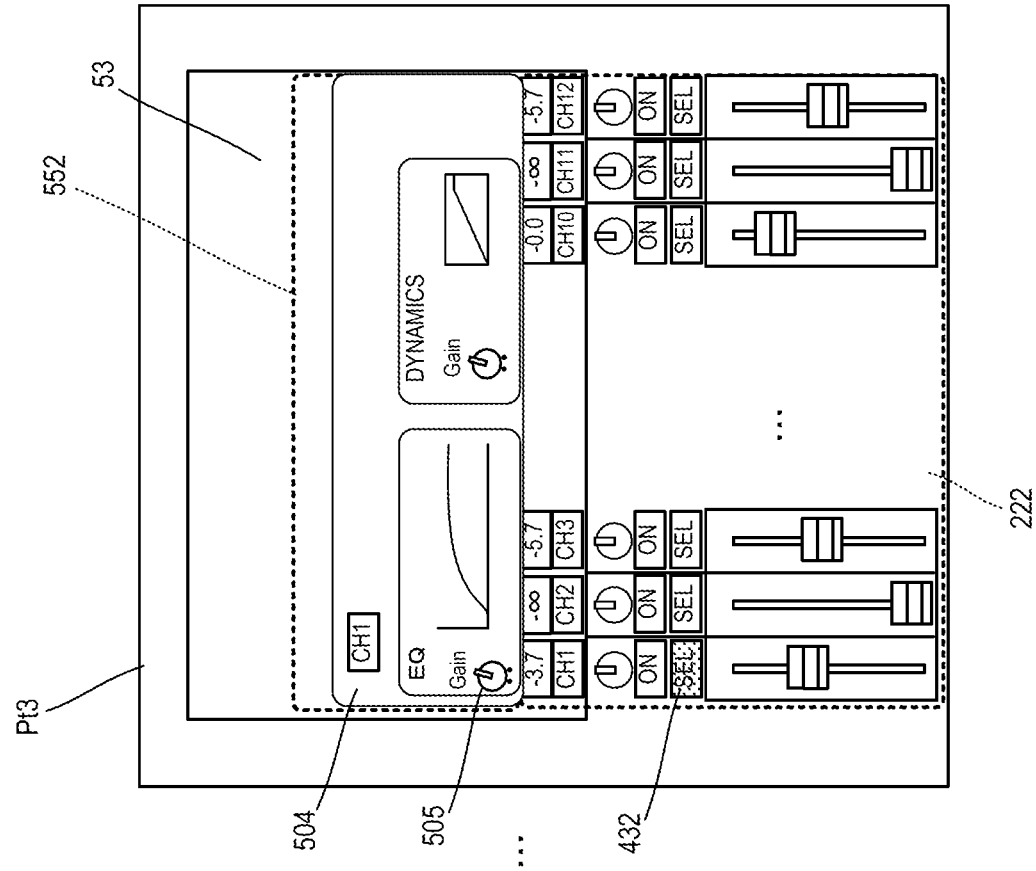
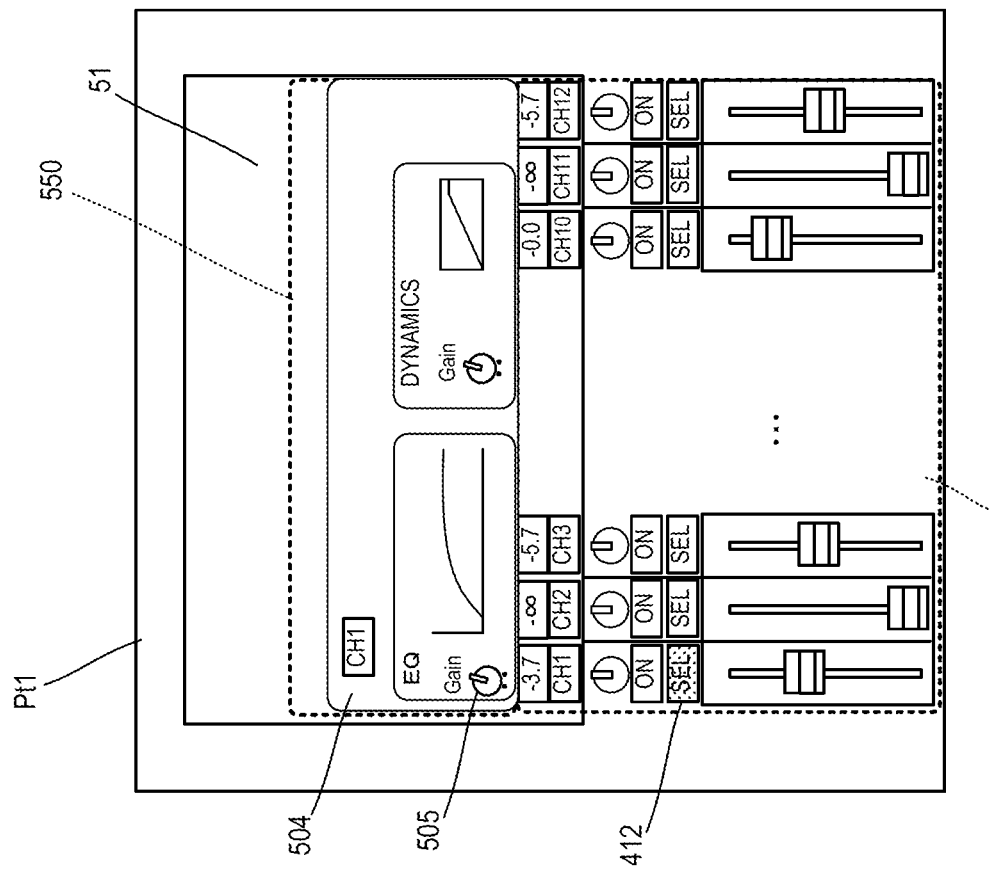
FIG.26

PARAMETER SETTING APPARATUS AND PARAMETER SETTING METHOD

CROSS REFERENCE TO RELATED APPLICATIONS

This Nonprovisional application claims priority under 35 U.S.C. § 119(a) on Patent Application No. 2020-044511 filed in Japan on Mar. 13, 2020 the entire contents of which are hereby incorporated by reference.

BACKGROUND

Technical Field

One embodiment of the present disclosure relates to a parameter setting apparatus and a parameter setting method.

Background Information

JP 2006-67106 A discloses an audio mixer including a display provided with a touch panel and an operation controller assigning a function of a touched portion.

The audio mixer also includes an operation controller configured to adjust a send level for a specific bus.

SUMMARY

The audio mixer is provided with a plurality of displays for a plurality of users in some cases. Then, it is difficult for a user who is away from the operation controller to operate the operation controller. On the other hand, the number of operation controllers increases if the operation controller as in JP 2006-67106 A is provided in each of the plurality of displays.

Therefore, one embodiment of the present disclosure aims to provide a parameter setting apparatus and a parameter setting method capable of reducing the number of operation controllers.

A parameter setting apparatus includes a first display device, a mode operation controller configured to receive either designation of a first adjustment mode for adjusting a send level or a second adjustment mode for adjusting a first parameter other than the send level, and a processing controller. The controller includes a processor. The processor controls the first display device to display a bus selection screen on the display device, selects a bus based on an operation on the displayed selection screen, causes the first operation controller to adjust a send level of the selected bus upon the mode operation controller receiving the designation of the first adjustment mode, and causes the first operation controller to adjust the first parameter upon the mode operation controller receiving the designation of the second adjustment mode.

According to one embodiment of the present disclosure, the number of operation controllers can be reduced.

BRIEF DESCRIPTION OF THE DRAWINGS

FIG. 26 is a view illustrating a first bay Pt1 and a third bay Pt3.

DETAILED DESCRIPTION

Figure 1:
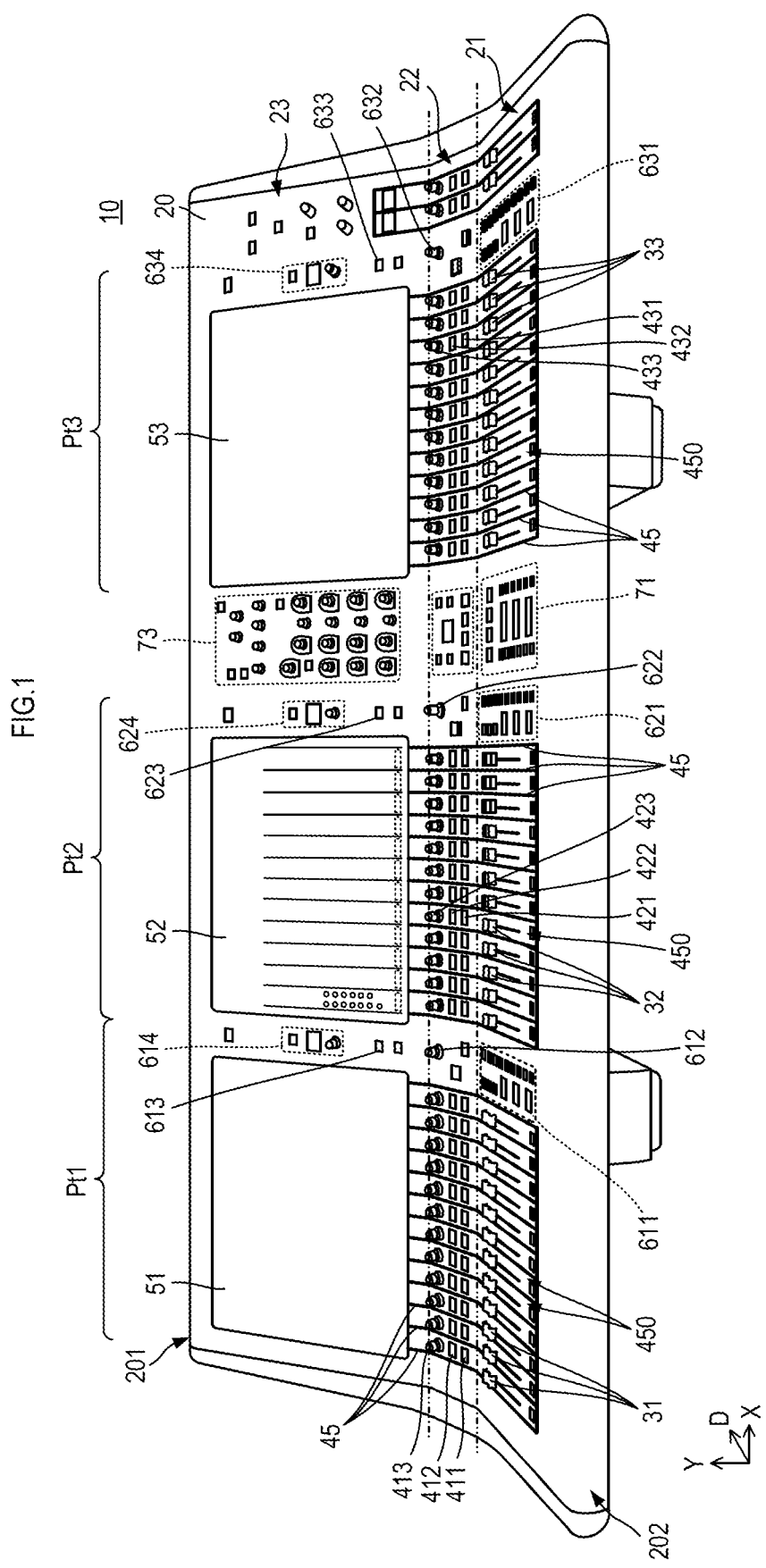
FIG. 1 is a front perspective view of an audio mixer.
Figure 2:
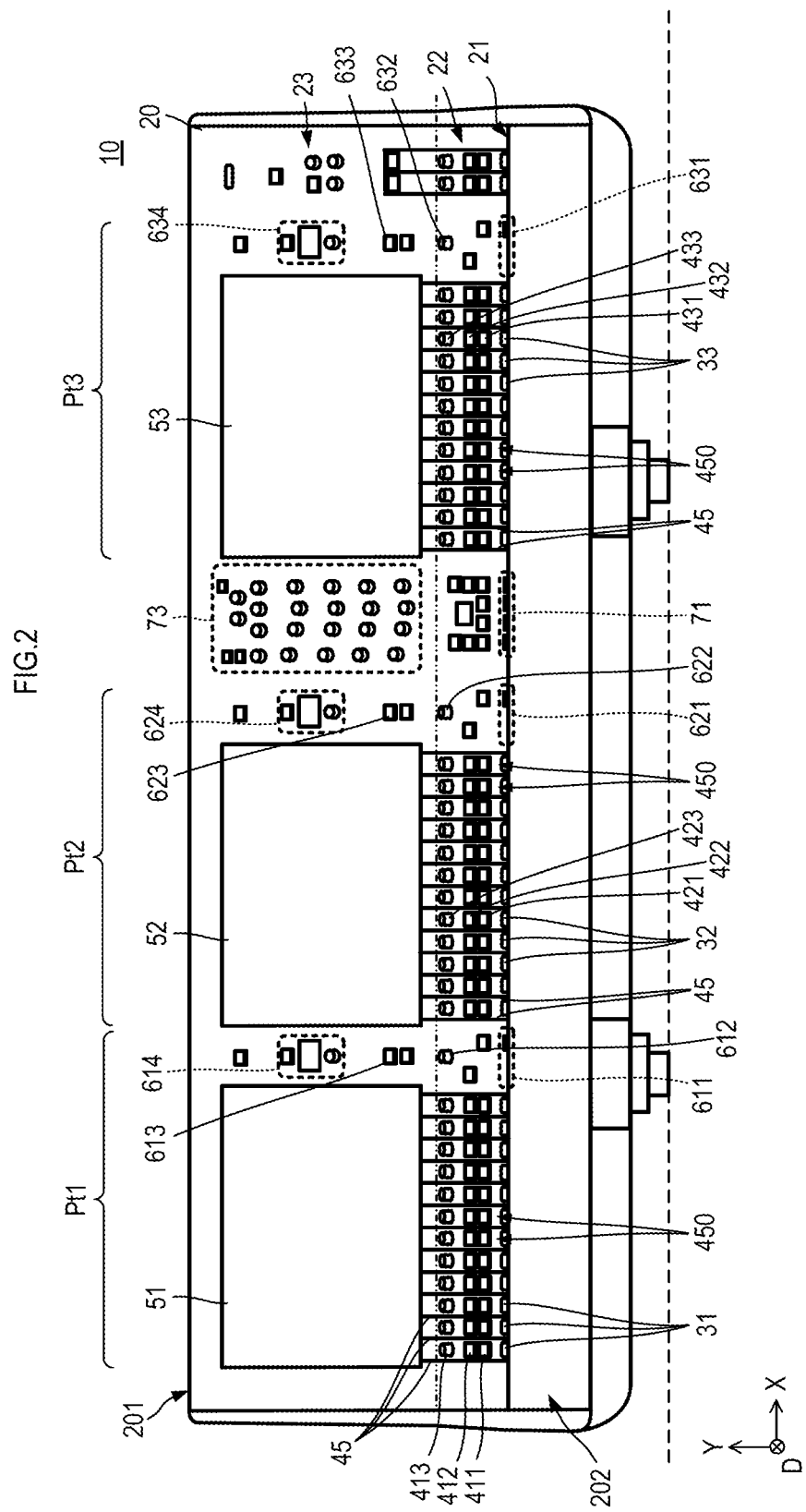
FIG. 2 is a front view of the audio mixer.
Figure 3:
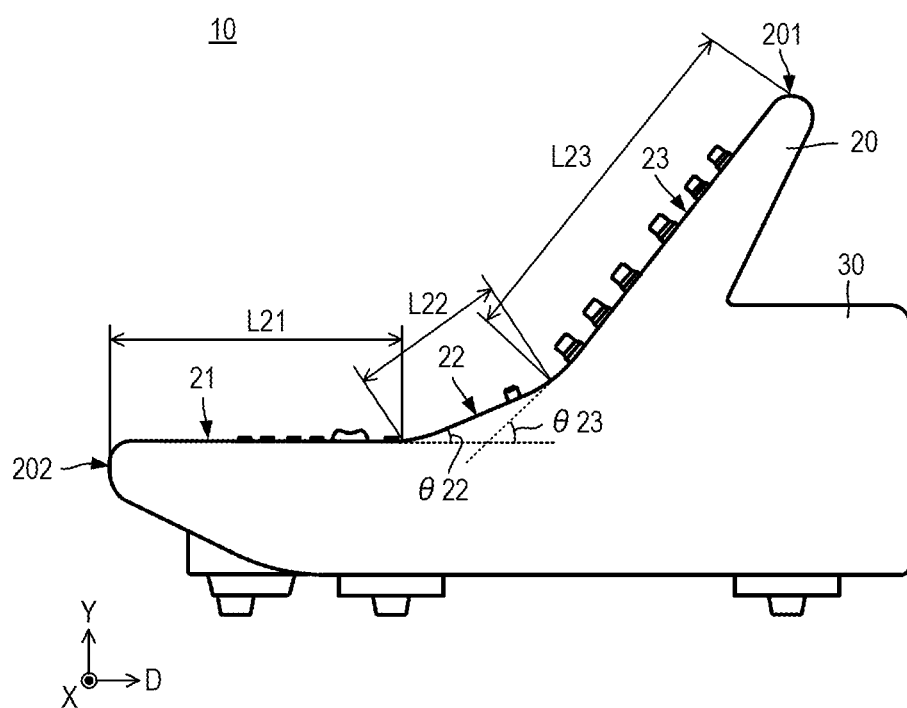
FIG. 3 is a side view of the audio mixer.
Figure 4:
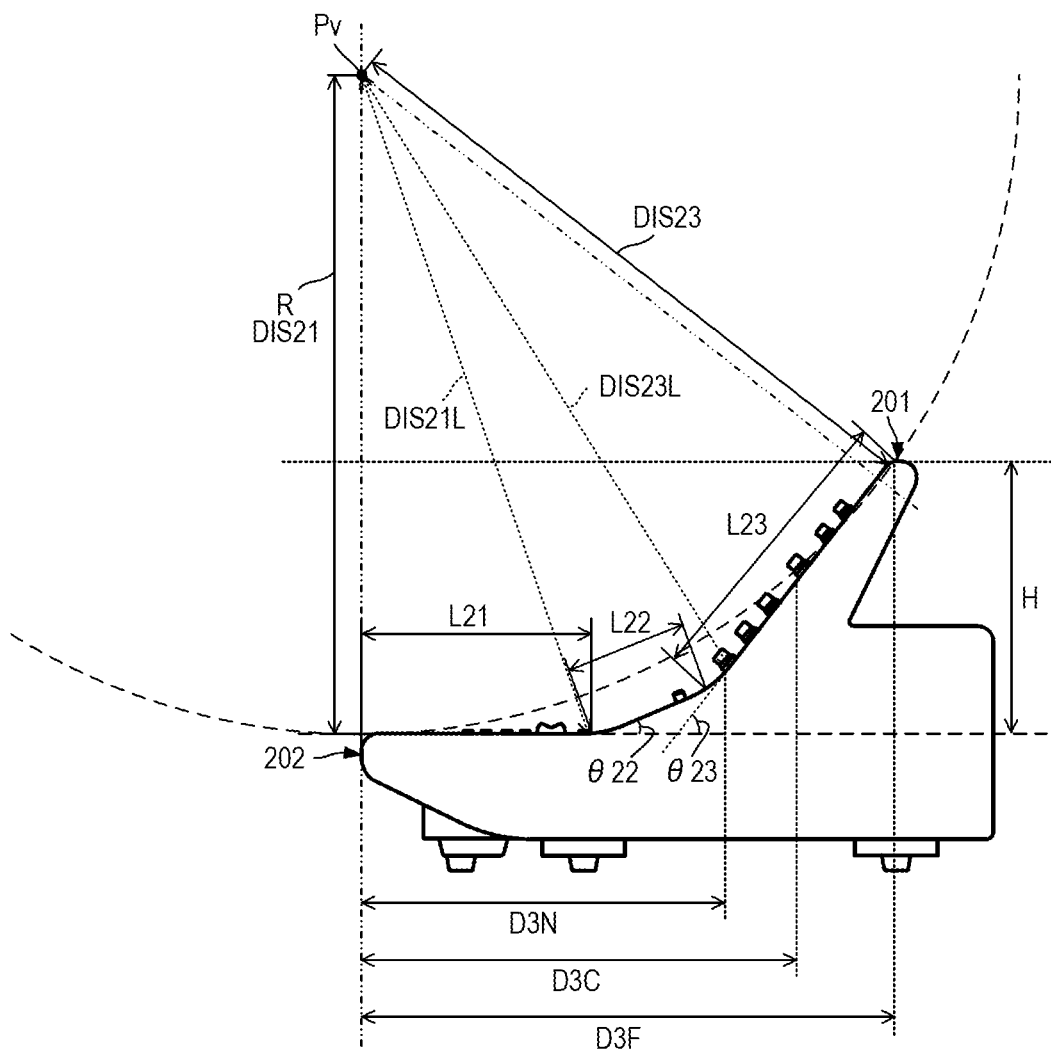
FIG. 4 is a side view illustrating dimensions and angles of each part of the audio mixer.
Figure 5:
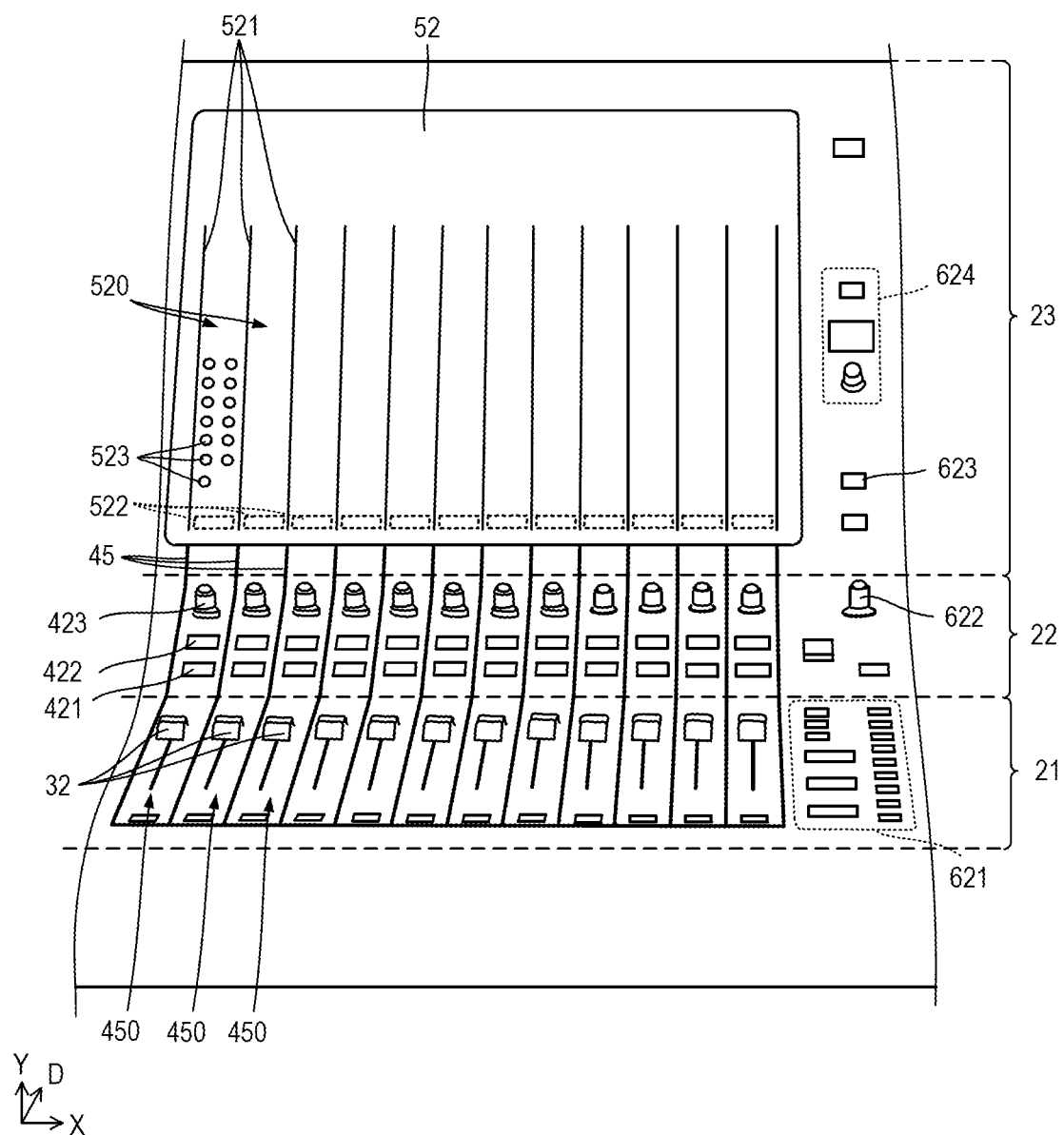
FIG. 5 is an enlarged front perspective view of a part of the audio mixer.

FIG. 1 is a front perspective view of an audio mixer. FIG. 2 is a front view of the audio mixer. FIG. 3 is a side view of the audio mixer. FIG. 4 is a side view illustrating dimensions and angles of each part of the audio mixer. FIG. 5 is an enlarged front perspective view of a part of the audio mixer.

As illustrated in FIGS. 1, 2, and 3, an audio mixer 10, which is an example of an audio processing apparatus or a parameter setting apparatus of the present disclosure, includes an operation panel 20 and a main body 30. The operation panel 20 is arranged in front of the main body 30, that is, on an operator side. The operation panel 20 and the main body 30 form an integrated housing. Various circuit boards and the like constituting the audio mixer 10 are arranged in the housing.

[Shape of Operation Panel 20]

The operation panel 20 has a first surface 21, a second surface 22, and a third surface 23. The first surface 21, the second surface 22, and the third surface 23 are connected in this order. The first surface 21 is a horizontal surface. The horizontal surface is a surface that is also horizontal when the audio mixer 10 is arranged on a horizontal plane.

The second surface 22 is arranged so as to be erected with respect to the first surface 21, and forms a predetermined angle θ22 (see FIG. 4) with respect to the first surface 21. The third surface 23 is arranged so as to be erected with respect to the first surface 21, and forms an angle θ23 (see FIG. 4) with respect to the first surface 21. The angle θ23 corresponds to a "first angle" of the present disclosure, and the angle θ22 corresponds to a "second angle" of the present disclosure. As a result, a side end surface connected to an end of the first surface 21 opposite to an end connected to the second surface 22 is a frontmost portion 202 of the operation panel 20. Further, an end of the third surface 23 opposite to an end connected to the second surface 22 is an uppermost portion 201 of the operation panel. That is, when the operation panel 20 is viewed from the front side, the first surface 21, the second surface 22, and the third surface 23 are connected in the up-down direction. Further, when the operation panel 20 is viewed from the lateral side, the first surface 21, the second surface 22, and the third surface 23 are connected in a shape substantially similar to an arc having the upper side of the front side of the operation panel 20 as the center.

In such a configuration, the angle θ23 is larger than the angle θ22 (θ23>θ22). Further, the second surface 22 and the third surface 23 are connected so as to have gradually increasing inclinations with respect to the first surface 21. Here, a distance from a reference position Pv to the third surface 23 is equal to or shorter than a distance from the reference position Pv to the first surface 21 by adjusting the angle θ23 and the angle θ22 as illustrated in FIG. 4. In other words, the third surface 23 is as far from the reference position Pv as the first surface 21 or closer to the reference position Pv than the first surface 21.

Note that the distance to be compared is the distance with respect to the reference position Pv calculated under the same conditions for the first surface 21 and the third surface 23. Specifically, as an example, a distance DIS21 (corresponding to a distance R) between the reference position Pv and a point that is a foot of a perpendicular line drawn from the reference position Pv to the first surface 21 and a distance DIS23 between the reference position Pv and a point that is a foot of a perpendicular line drawn from the reference position Pv to the third surface 23 are compared. In this case, the distance DIS23 is equal to or shorter than the distance DIS21 (DIS23≤DIS21). Further, as another example, in the side view, a distance DIS21L between the reference position Pv and a point on the first surface 21 farthest from the reference position Pv (near a connection point between the first surface 21 and the second surface 22) and a distance DIS23L between the reference position Pv and a point on the third surface 23 farthest from the reference position Pv (near a connection point between the third surface 23 and the second surface 22) are compared. In this case, the distance DIS23L is equal to or shorter than the distance DIS21L (DIS23L≤DIS21L). Strictly speaking, "equal" referred to herein means "same", but includes variations caused by a manufacturing error or the like.

Here, the reference position Pv is a position separated from the frontmost portion 202 of the operation panel 20 in a height direction by a predetermined distance (distance R in the case of FIG. 4) and higher than the uppermost portion 201 of the operation panel 20. That is, the distance R between the frontmost portion 202 and the reference position Pv is longer than a height H of the uppermost portion 201 of the operation panel 20 with the first surface 21 as the reference.

When operating the audio mixer 10, the operator needs to operate the operation panel 20 while visually recognizing a performance venue or the like on a side opposing the audio mixer 10. That is, the operator needs to visually recognize the performance venue while visually recognizing the operation panel 20. Thus, positions of the operator's eyes are inevitably higher than the uppermost portion 201 of the operation panel 20. Meanwhile, when operating the operation panel 20, the operator usually operates the operation panel 20 with his/her body approaching the frontmost portion 202 of the operation panel 20 in order to operate the entire operation panel 20. Thus, the positions of the operator's eyes exist on an extension line in the height direction of the frontmost portion 202 of the operation panel 20. For this reason, the above-described reference position Pv corresponds to the positions of the operator's eyes during the general use of the audio mixer 10. That is, the reference position Pv is set based on the general position of the operator of the audio mixer 10.

Since the third surface 23 is closer to the reference position Pv than the first surface 21 as described above, the operator can easily operate the entire operation panel 20. That is, the audio mixer 10 can improve the operability of the operation panel 20.

More specifically, the angle θ23 is preferably larger than 35°. As a result, the operator can easily perform the operation on the third surface 23 similarly to the operation on the first surface 21.

The angle θ22 is preferably an angle smaller than half of the angle θ23. As a result, a sudden change in inclination from the first surface 21 to the third surface 23 is mitigated by the second surface 22. Therefore, the operator can easily see, understand the connection from the first surface 21 to the third surface 23, and easily perform the operation.

As illustrated in FIG. 4, a length L21 of the first surface 21 is shorter than a length L23 of the third surface 23 in the audio mixer 10. Here, in the side view, a distance from the frontmost portion 202 to the third surface 23 may be a distance D3N between the frontmost portion 202 and a position where the third surface 23 and the second surface 22 are connected (the position on the third surface 23 closest to the frontmost portion 202), may be a distance D3C between a central position of the third surface 23 and the frontmost portion 202, or may be a distance D3F between the frontmost portion 202 and a position of the uppermost portion 201 on the third surface 23 (the position on the third surface 23 farthest from the frontmost portion 202). Further, the reference of the distance may be any position on the third surface 23. That is, the entire third surface 23 is closer to the frontmost portion 202 of the operation panel 20 than that in the conventional configuration. With this configuration, the audio mixer 10 can reduce a depth of an apparatus and reduce a size. Further, with this configuration, the distance from the frontmost portion 202 of the operation panel 20 to the third surface 23 can be shortened so that the operability is improved.

A length L22 of the second surface 22 is shorter than the length L21 of the first surface 21. As a result, the distance between the first surface 21 and the third surface 23 becomes shorter. Therefore, it is easy for the operator to visually recognize the relationship between a fader arranged on the first surface 21 (details will be described later) and a display element of a display arranged on the third surface 23 (details will be described later).

[Arrangement of Operation Controllers or the Like Arranged on Operation Panel 20]

As illustrated in FIGS. 1 and 2, the audio mixer 10 includes a plurality of faders 31, a plurality of faders 32, a plurality of faders 33, a plurality of ON switches 411, a plurality of ON switches 421, a plurality of ON switches 431, a plurality of SEL switches 412, a plurality of SEL switches 422, a plurality of SEL switches 432, a plurality of encoders 413, a plurality of encoders 423, a plurality of encoders 433, a display 51, a display 52, a display 53, a bank selection section 611, a bank selection section 621, a bank selection section 631, a touch and turn knob 612, a touch and turn knob 622, a touch and turn knob 632, an encoder assign key 613, an encoder assign key 623, an encoder assign key 633, a user-defined knob section 614, a user-defined knob section 624, a user-defined knob section 634, a user-defined key section 71, and a selected channel section 73.

The plurality of faders 31, the plurality of faders 32, and the plurality of faders 33 are examples of a channel operation controller and have the same configuration and function. The plurality of ON switches 411, the plurality of ON switches 421, and the plurality of ON switches 431 have the same configuration and function. The plurality of SEL switches 412, the plurality of SEL switches 422, and the plurality of SEL switches 432 have the same configuration and function. The plurality of encoders 413, the plurality of encoders 423, and the plurality of encoders 433 have the same configuration and function. The display 51, the display 52, and the display 53 have the same configuration and function. Touch panels are laminated on the display 51, the display 52, and the display 53, respectively. The bank selection section 611, the bank selection section 621, and the bank selection section 631 have the same configuration and function. The touch and turn knob 612, the touch and turn knob 622, and the touch and turn knob 632 have the same configuration and function. Note that the touch and turn knob is an operation controller that receives a change of a value caused by an operation of a knob when a parameter, an image, or the like on the touch panel is touched and the value corresponding to the parameter, the image, or the like is assigned to the knob. The encoder assign key 613, the encoder assign key 623, and the encoder assign key 633 have the same configuration and function. The user-defined knob section 614, the user-defined knob section 624, and the user-defined knob section 634 have the same configuration and function.

The operation panel 20 has a first operation portion Pt1, a second operation portion Pt2, and a third operation portion Pt3 in a width direction (lateral direction (X direction in FIGS. 1 and 2)).

The plurality of faders 31, the plurality of ON switches 411, the plurality of SEL switches 412, the plurality of encoders 413, the display 51, the bank selection section 611, the touch and turn knob 612, the encoder assign key 613, and the user-defined knob section 614 are arranged in the first operation portion Pt1. The plurality of faders 31 and the bank selection section 611 are arranged on the first surface 21. The plurality of ON switches 411, the plurality of SEL switches 412, the plurality of encoders 413, and the touch and turn knob 612 are arranged on the second surface 22. The display 51, the encoder assign key 613, and the user-defined knob section 614 are arranged on the third surface 23.

The plurality of faders 32, the plurality of ON switches 421, the plurality of SEL switches 422, the plurality of encoders 423, the display 52, the bank selection section 621, the touch and turn knob 622, the encoder assign key 623, and the user-defined knob section 624 are arranged in the second operation portion Pt2. The plurality of faders 32 and the bank selection section 621 are arranged on the first surface 21. The plurality of ON switches 421, the plurality of SEL switches 422, the plurality of encoders 423, and the touch and turn knob 622 are arranged on the second surface 22. The display 52, the encoder assign key 623, and the user-defined knob section 624 are arranged on the third surface 23.

The plurality of faders 33, the plurality of ON switches 431, the plurality of SEL switches 432, the plurality of encoders 433, the display 53, the bank selection section 631, the touch and turn knob 632, the encoder assign key 633, and the user-defined knob section 634 are arranged in the third operation portion Pt3. The plurality of faders 33 and the bank selection section 631 are arranged on the first surface 21. The plurality of ON switches 431, the plurality of SEL switches 432, the plurality of encoders 433, and the touch and turn knob 632 are arranged on the second surface 22. The display 53, the encoder assign key 633, and the user-defined knob section 634 are arranged on the third surface 23.

Each of the user-defined key section 71 and the selected channel section 73 includes a plurality of types of operation controllers. The user-defined key section 71 and the selected channel section 73 are arranged between the second operation portion Pt2 and the third operation portion Pt3. The user-defined key section 71 is arranged on the first surface 21 and the selected channel section 73 is arranged on the third surface 23. The user-defined key section 71 and the selected channel section 73 are arranged at substantially the same position in the lateral direction of the operation panel 20.

The arrangement of the above-described various operation controllers in the first operation portion Pt1, the arrangement of the above-described various operation controllers in the second operation portion Pt2, and the arrangement of the above-described various operation controllers in the third operation portion Pt3 are the same. Therefore, a specific example of the arrangement of the plurality of types of operation controllers and the like in each of the operation portions will be described with reference to FIG. 5 by taking the second operation portion Pt2 as an example.

As illustrated in FIG. 5, the plurality of faders 32 are arranged on the first surface 21. The plurality of faders 32 are arranged at equal intervals along the lateral direction of the operation panel 20 (D direction in FIGS. 1 and 5). At this time, the plurality of faders 32 are arranged such that a moving direction is parallel to a depth direction of the operation panel 20 (D direction in FIGS. 1 and 5).

The plurality of ON switches 421, the plurality of SEL switches 422, and the plurality of encoders 423 are arranged on the second surface 22. The plurality of ON switches 421, the plurality of SEL switches 422, and the plurality of encoders 423 are arranged so as to correspond to the plurality of faders 32, respectively. That is, one ON switch 421, one SEL switch 422, and one encoder 423 are arranged for one fader 32.

The plurality of ON switches 421, the plurality of SEL switches 422, and the plurality of encoders 423 are arranged in this order from the end connected to the first surface 21 to the end connected to the third surface 23 on the second surface 22. In other words, the plurality of ON switches 421 are arranged in the vicinity of the first surface 21 on the second surface 22, the plurality of encoders 423 are arranged in the vicinity of the third surface 23 on the second surface 22, and the plurality of SEL switches 422 are arranged between the plurality of ON switches 421 and the plurality of encoders 423.

The ON switch 421, the SEL switch 422, and the encoder 423, which correspond to one fader 32, are aligned side by side on an extension line of the moving direction of the fader 32. The fader 32, the ON switch 421, the SEL switch 422, and the encoder 423 are arranged adjacent to each other in this order. In other words, no other operation controllers are arranged among the fader 32, the ON switch 421, the SEL switch 422, and the encoder 423. With such a configuration, the operator can visually recognize the correspondence among the fader 32, the ON switch 421, the SEL switch 422, and the encoder 423 that constitute one channel in an easy manner.

Further, a plurality of dividing lines 45 defining channel strips are drawn on the operation panel 20. The plurality of dividing lines 45 have a shape that extends continuously on the first surface 21 and the second surface 22 of the operation panel 20. One ends of the plurality of dividing lines 45 in an extending direction reach the end of the first surface 21 opposite to the end connected to the second surface 22, and the other ends reach the end of the second surface 22 connected to the third surface 23. As a result, the plurality of dividing lines 45 divide an area for each channel corresponding to a set of the fader 32, the ON switch 421, the SEL switch 422, and the encoder 423. With this configuration, the operator can visually recognize the correspondence among the fader 32, the ON switch 421, the SEL switch 422, and the encoder 423 that constitute one channel in an easier manner.

As illustrated in FIG. 5, colors of adjacent channel operation areas 450 among the plurality of channel operation areas 450 divided by the plurality of dividing lines 45 are different in the operation panel 20. With this configuration, the operator can more easily identify the plurality of channels, and visually recognize the correspondence among the fader 32, the ON switch 421, the SEL switch 422, and the encoder 423 that constitute one channel in an easier manner.

Further, the plurality of dividing lines 45 are connected on the first surface 21 and the second surface 22. Therefore, the first surface 21 and the second surface 22 seem to have continuity for the operator. Thus, even if the length L21 of the first surface 21 is shorter than the length L23 of the third surface 23, the size balance between the upper part and the lower part of the operation panel 20 is good. In particular, this visual effect is further improved if the angle θ22 between the first surface 21 and the second surface 22 is smaller than half of the angle θ23 between the first surface 21 and the third surface 23.

The display 52 is arranged on the third surface 23. The touch panel is laminated on the display 52. That is, the display 52 can also be used as a type of operation controller as a touch panel display.

In the lateral direction of the operation panel 20 (X direction in FIGS. 1 and 5), the display 52 is arranged at the same position as an arrangement area of the plurality of faders 32. In other words, the display 52 is aligned side by side with the plurality of faders 32 in a vertical direction of the operation panel 20 (Y direction in FIGS. 1 and 5), and is arranged above the arrangement area of the plurality of faders 32 with substantially the same width as the arrangement area of the plurality of faders 32 when the operation panel 20 is viewed from the front side. As a result, the operator can visually recognize the correspondence between the plurality of faders 32 and the display 52 in an easy manner. In this configuration, in the vertical direction of the operation panel 20 (Y direction in FIGS. 1 and 5), the display 52 is arranged on an extension line in which the plurality of ON switches 421, the plurality of SEL switches 422, and the plurality of encoders 423 are arranged from the plurality of faders 32. As a result, the operator can visually recognize the correspondence between the display 52 and each of the plurality of faders 32, the plurality of ON switches 421, the plurality of SEL switches 422, and the plurality of encoders 423 in an easy manner.

Further, the display 52 displays a plurality of pieces of channel information 522 and a plurality of pieces of operation information 523. The channel information 522 indicates a channel assigned by the corresponding fader 32. The operation information 523 indicates an operation state set for this channel.

More specifically, the display 52 displays the plurality of pieces of channel information 522 and the plurality of pieces of operation information 523 for each set of the above-described fader 32, ON switch 421, SEL switch 422, and encoder 423, that is, for each channel. The display 52 displays the plurality of pieces of channel information 522 and the plurality of pieces of operation information 523 on the extension line of the moving direction of the plurality of faders 32. In other words, the display 52 displays the channel information 522 and the operation information 523 on an extension line of a direction in which the set of the fader 32, the ON switch 421, the SEL switch 422, and the encoder 423 is aligned. As a result, the operator can visually recognize the correspondence between the channel information 522 and each of the fader 32, the ON switch 421, the SEL switch 422, and the encoder 423 in an easy manner.

Further, the display 52 displays the channel information 522 in a lower portion in a display area, more preferably at a lower end in the display area, as illustrated in FIG. 5. As a result, the distance between the channel information 522 and each of the fader 32, the ON switch 421, the SEL switch 422, and the encoder 423 becomes even closer. Therefore, the operator can visually recognize the correspondence between the channel information 522 and each of the fader 32, the ON switch 421, the SEL switch 422, and the encoder 423 in an easier manner.

Further, the display 52 displays dividing lines 521 which divide the plurality of pieces of channel information 522 and the plurality of pieces of operation information 523. The display 52 displays the dividing line 521 on an extension line of the dividing line 45. As a result, the operator can visually recognize the correspondence between the channel information 522 and each of the fader 32, the ON switch 421, the SEL switch 422, and the encoder 423 and further the correspondence between the operation information 523 and each of the fader 32, the ON switch 421, the SEL switch 422, and the encoder 423 in an easy manner.

The bank selection section 621 includes a plurality of types of operation controllers, displays, and the like. The bank selection section 621 is arranged on the first surface 21. The bank selection section 621 is arranged to be adjacent to the arrangement area of the plurality of faders 32.

The touch and turn knob 622 is arranged on the second surface 22. The touch and turn knob 622 is arranged to be adjacent to an arrangement area of the plurality of ON switches 421, the plurality of SEL switches 422, and the plurality of encoders 423.

The encoder assign key 623 and the user-defined knob section 624 are arranged on the third surface 23. The user-defined knob section 624 includes a plurality of types of operation controllers and the like. The encoder assign key 623 and the user-defined knob section 624 are arranged to be adjacent to the display 52.

The bank selection section 621, the touch and turn knob 622, the encoder assign key 623, and the user-defined knob section 624 are aligned side by side along the vertical direction of the operation panel 20 (Y direction in FIGS. 1 and 5).

[Hardware Configuration of Audio Mixer 10]

Figure 6:
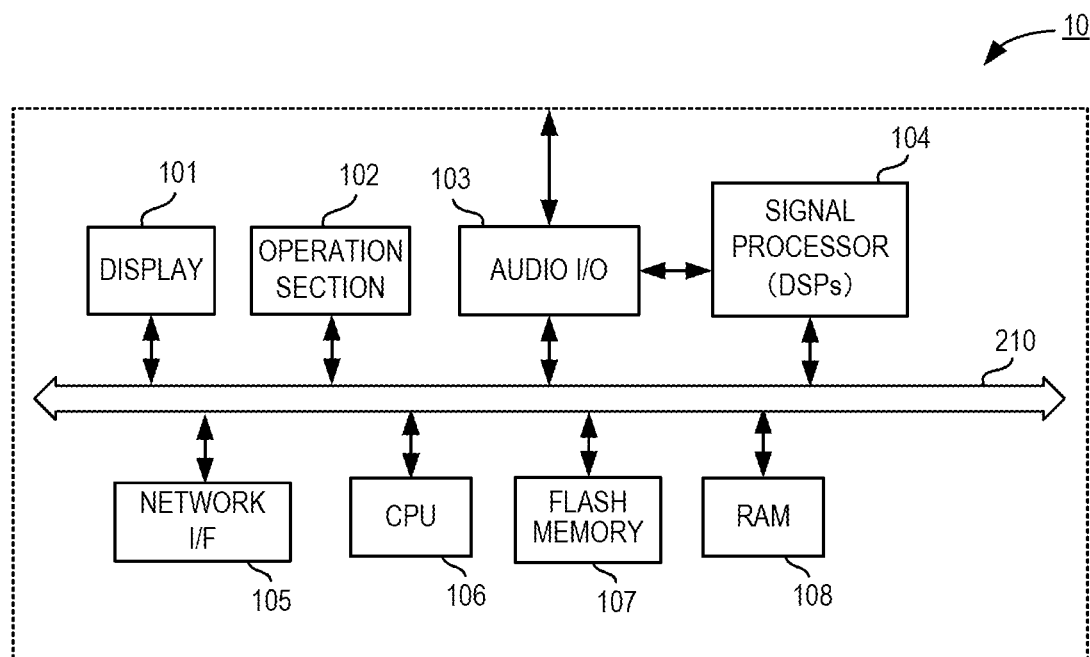
FIG. 6 is a block diagram illustrating a hardware configuration of the audio mixer.

FIG. 6 is a block diagram illustrating the main hardware configuration of the audio mixer 10. The audio mixer 10 includes a display 101, an operation section 102, an audio I/O 103, a signal processor 104, a network I/F 105, a CPU 106, a flash memory 107, and a RAM 108. These configurations are connected via a bus 210.

The CPU 106 controls an operation of the audio mixer 10. The CPU 106 performs various operations by reading a predetermined program stored in the flash memory 107, which is a storage medium, into the RAM 108 and executing the program. Note that the program is not necessarily stored in the flash memory 107 of the own apparatus. For example, the program may be downloaded from another apparatus such as a server and read into the RAM 108.

For example, the CPU 106 inputs and outputs a sound signal to and from the audio I/O 103 or controls mixing processing and effect processing in the signal processor 104, and changes values of parameters related thereto. The CPU 106 is an example of "a controller" in the present disclosure.

The display 101 corresponds to the above-described displays 51, 52, and 53, a light emitting diode (LED), and the like. The display 101 displays various types of information according to the control of the CPU 106.

The operation section 102 receives an operation on the audio mixer 10 from a user. The operation section 102 is constituted by various operation controllers. Further, the operation section 102 may be constituted by the touch panels laminated on the displays 51, 52, and 53.

The signal processor 104 is constituted by a plurality of digital signal processors (DSPs) configured to perform various types of signal processing such as mixing processing and effect processing. The signal processor 104 performs signal processing such as mixing processing and effect processing on the sound signal supplied from the audio I/O 103. The signal processor 104 outputs a digital sound signal after having been subjected to the signal processing via the audio I/O 103.

[Signal Processing Function of Audio Mixer 10]

Figure 7:
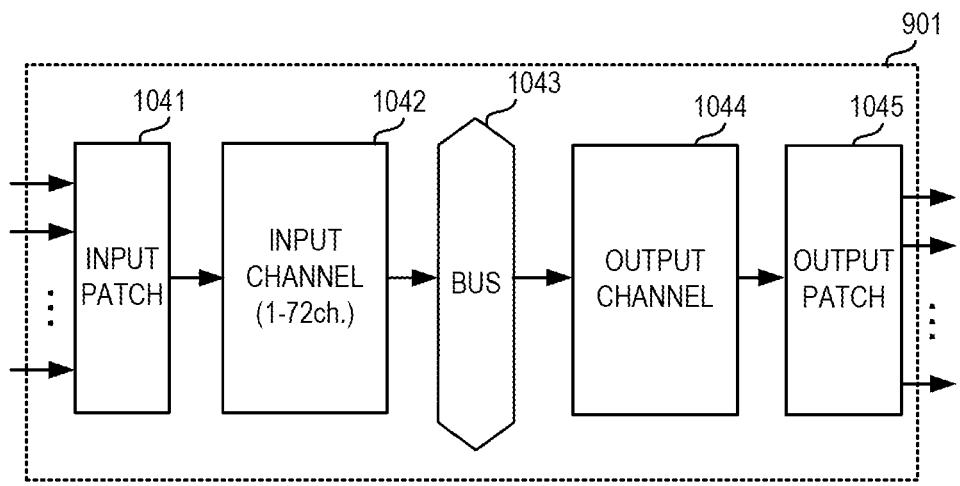
FIG. 7 is a diagram illustrating a functional configuration of a signal processing block 901 performed in a signal processor 104, an audio I/O 103, and a CPU 106.

FIG. 7 is a diagram illustrating a functional configuration of a signal processing block 901 performed in the signal processor 104, the audio I/O 103, and the CPU 106. As illustrated in FIG. 7, the signal processing block 901 is constituted by an input patch 1041, an input channel 1042, a bus 1043, an output channel 1044, and an output patch 1045. In this example, the input channel 32 has 72 (1-72) channels. The bus 1043 includes various buses such as a stereo bus, a MIX bus, and a MATRIX bus. The output channel 1044 is a block that processes a sound signal transmitted from each bus.

Figure 8:
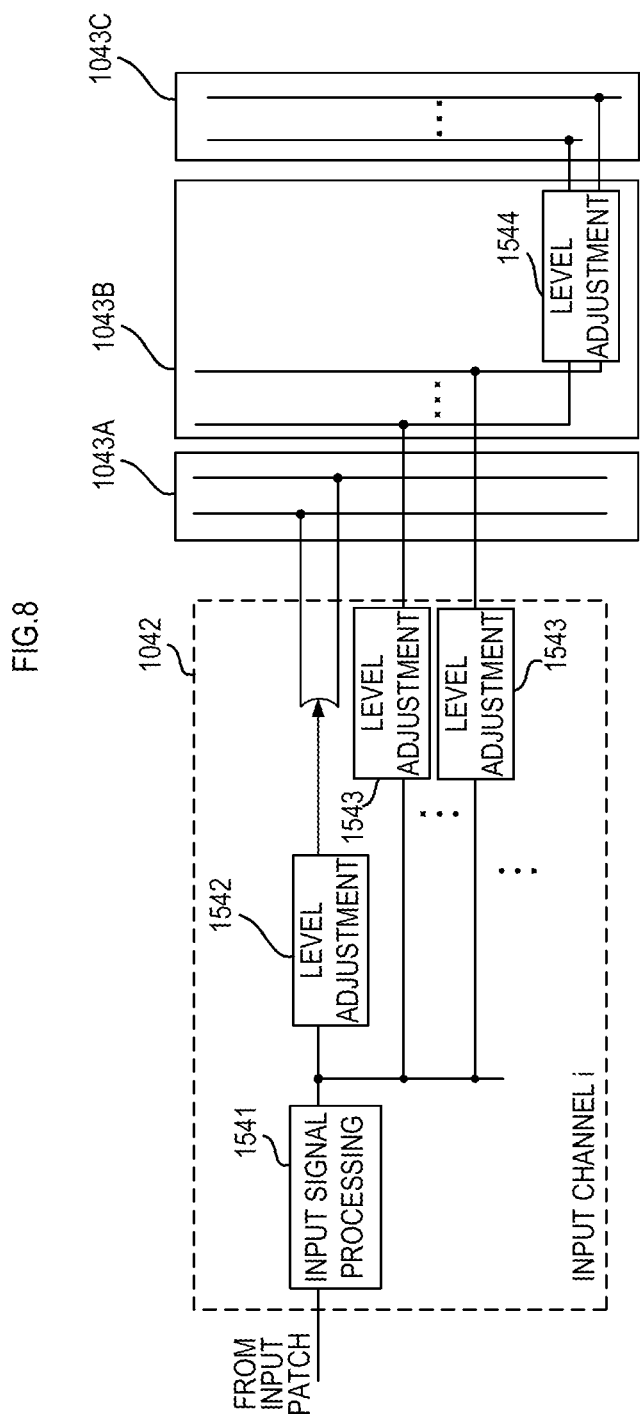
FIG. 8 is a diagram illustrating a configuration of signal processing of a certain input channel i.

An audio signal is supplied from the input patch 1041 to each input channel i of the input channel 1042. FIG. 8 is a diagram illustrating a configuration of signal processing of a certain input channel i. An input signal processing block 1541 of the input channel 1042 performs signal processing such as an equalizer (EQ) and a compressor (COMP) on the audio signal supplied from the input patch 1041.

Each of the input channels i of the input channel 1042 selectively transmits the audio signal after having been subjected to the signal processing to a subsequent bus (stereo bus 1043A, MIX bus 1043B, MATRIX bus 1043C, or the like).

Levels of the audio signals transmitted by the input channels i are individually adjusted for each bus by the user. For example, the level of the audio signal transmitted to the stereo bus 1043A is adjusted in a level adjustment block 1542. The level adjustment block 1542 corresponds to, for example, any of a plurality of faders 31, 32, and 33. The level adjustment block 1542 adjusts the level of the audio signal in response to positions of the plurality of faders 31, 32, and 33.

Further, the level of the audio signal transmitted to the MIX bus 1043B is adjusted in a level adjustment block 1543. The level adjustment block 1543 corresponds to, for example, any of a plurality of encoders 413, 423, and 433. Each of the plurality of encoders 413, 423, and 433 is configured using a rotary operation controller. The level adjustment block 1543 adjusts the level of the audio signal in response to rotation positions of the plurality of encoders 413, 423, and 433.

In this example, the MIX bus 1043B is routed to the MATRIX bus 1043C. The MATRIX bus 1043C mixes the audio signal transmitted from the MIX bus 1043B.

The level of the audio signal transmitted to the MATRIX bus 1043C is adjusted in a level adjustment block 1544. The level adjustment block 1544 corresponds, for example, to a user-defined knob 6141 provided in the user-defined knob section 624. The user-defined knob 6141 will be described later. The level adjustment block 1544 adjusts the level of the audio signal in response to a rotation position of the user-defined knob 6141.

Each of the stereo bus 1043A, the MIX bus 1043B, and the MATRIX bus 1043C mixes the supplied audio signals and outputs the mixed audio signal to the corresponding output channel 1044.

Each channel of the output channel 1044 performs signal processing such as an equalizer and a compressor on the input audio signal. The audio signal after having been subjected to the signal processing is supplied to the audio I/O 103.

[Encoder]

The encoder 413 will be described with reference to FIG. 9. Since the encoders 413, 423 and 433 have the same configuration and functions, the encoder 413 will be described as a representative in FIG. 9.

The encoder 413 is a rotary operation controller. The encoder 413 is provided for each of channels in the channel strips. The CPU 106 detects an operation amount of the encoder 413. The CPU 106 detects the operation amount of the encoder 413 as a first operation amount for a parameter displayed on the display 51 in a first mode (screen encoder mode), and detects the operation amount of the encoder 413 as a second operation amount for a parameter for each channel in a second mode (channel encoder mode).

Figure 9:
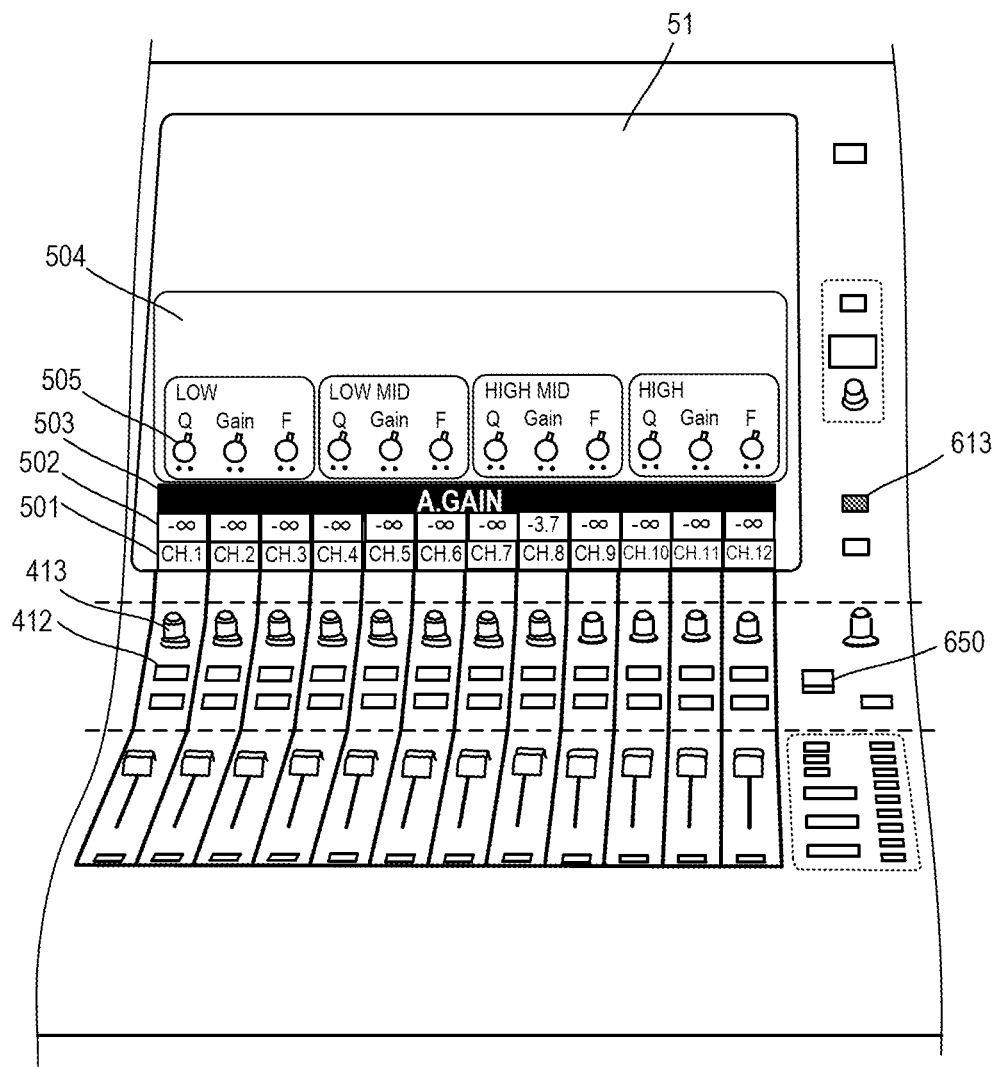
FIG. 9 is a front perspective view illustrating a state of a channel encoder mode.
Figure 10:
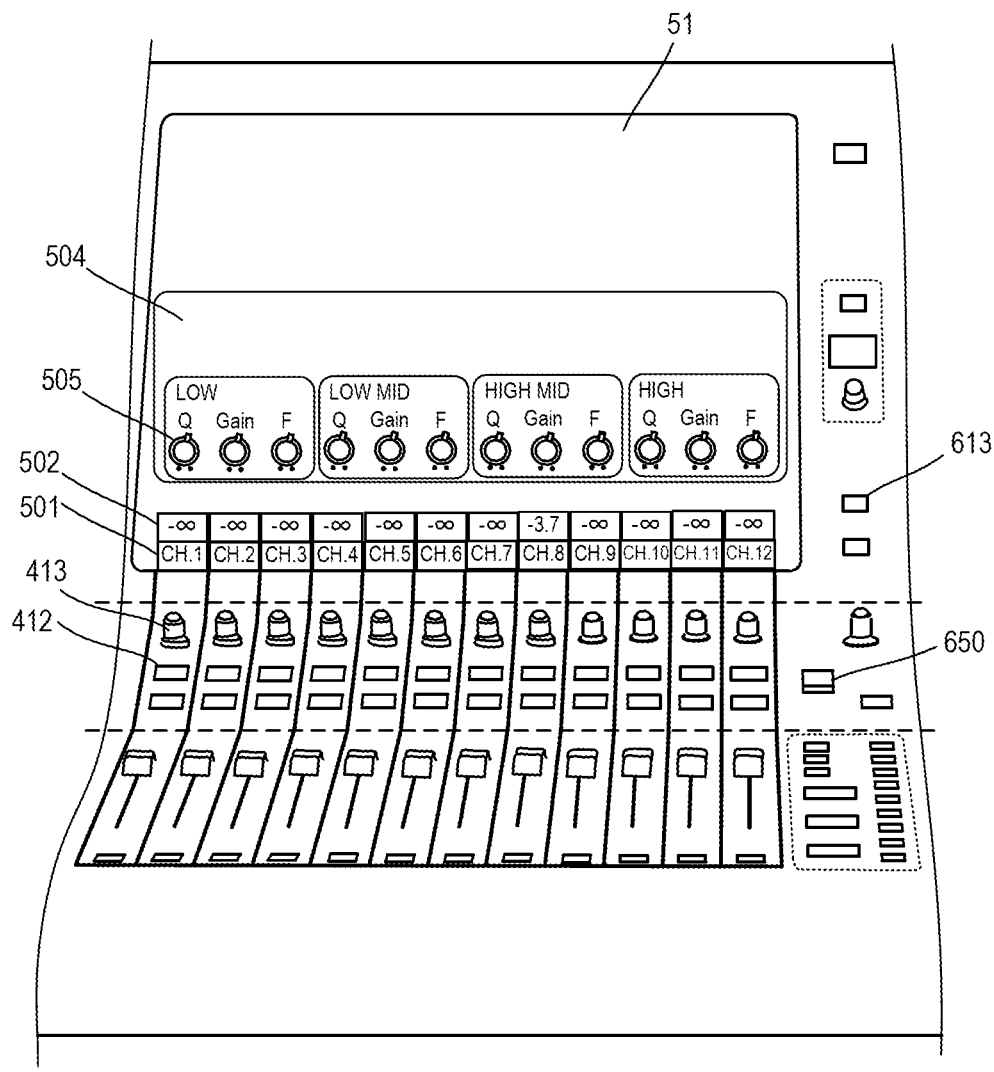
FIG. 10 is a front perspective view illustrating a state of a screen encoder mode.

FIG. 9 is a front perspective view illustrating a state of the channel encoder mode. FIG. 10 is a front perspective view illustrating a state of the screen encoder mode.

As illustrated in FIG. 9, the display 51 displays a channel name 501, a channel parameter 502, a parameter name 503, and a screen parameter window 504 in the channel encoder mode. The display 51 further displays operation controller icons 505 in the screen parameter window 504.

The channel name 501 is displayed for each channel in the lowermost part of the display 51. In other words, the channel name 501 is displayed at the position closest to the various operation controllers for each channel. As a result, the user can easily determine a name of each channel even if the channel name is not printed on the channel strip. Further, the audio mixer 10 does not need to secure a place where the channel name is printed, and thus, a size of the housing can be reduced.

The channel parameter 502 is displayed for each channel. The parameter name 503 is displayed across a plurality of channels. That is, the display 51 displays a parameter across the plurality of channels in the channel encoder mode. Further, the display 51 highlights the parameter name 503 in the example of FIG. 9. On the other hand, in the screen encoder mode, the parameter name 503 is not displayed as illustrated in FIG. 10.

The user can easily determine that the state of the encoder 413 is the channel encoder mode by visually recognizing the parameter name 503. Further, the user can easily determine the parameter assigned to the encoder 413 by viewing the parameter name 503.

The screen parameter window 504 changes display modes of the plurality of operation controller icons 505 in the screen encoder mode. For example, as illustrated in FIG. 10, operation controller icons are surrounded by a white frame. As a result, the user can easily determine that the state of the encoder 413 is the screen encoder mode.

The encoder assign key 613 is arranged on the right side of the display 51. The encoder assign key 613 emits light in the channel encoder mode. As a result, the user can visually recognize that the state of the encoder 413 is the channel encoder mode in an easy manner.

The encoder assign key 613 is an example of a mode operation controller or a receiver that receives an operation for switching between the first mode and the second mode. When the user presses the encoder assign key 613, the CPU 106 switches between the channel encoder mode and the screen encoder mode.

Figure 13:
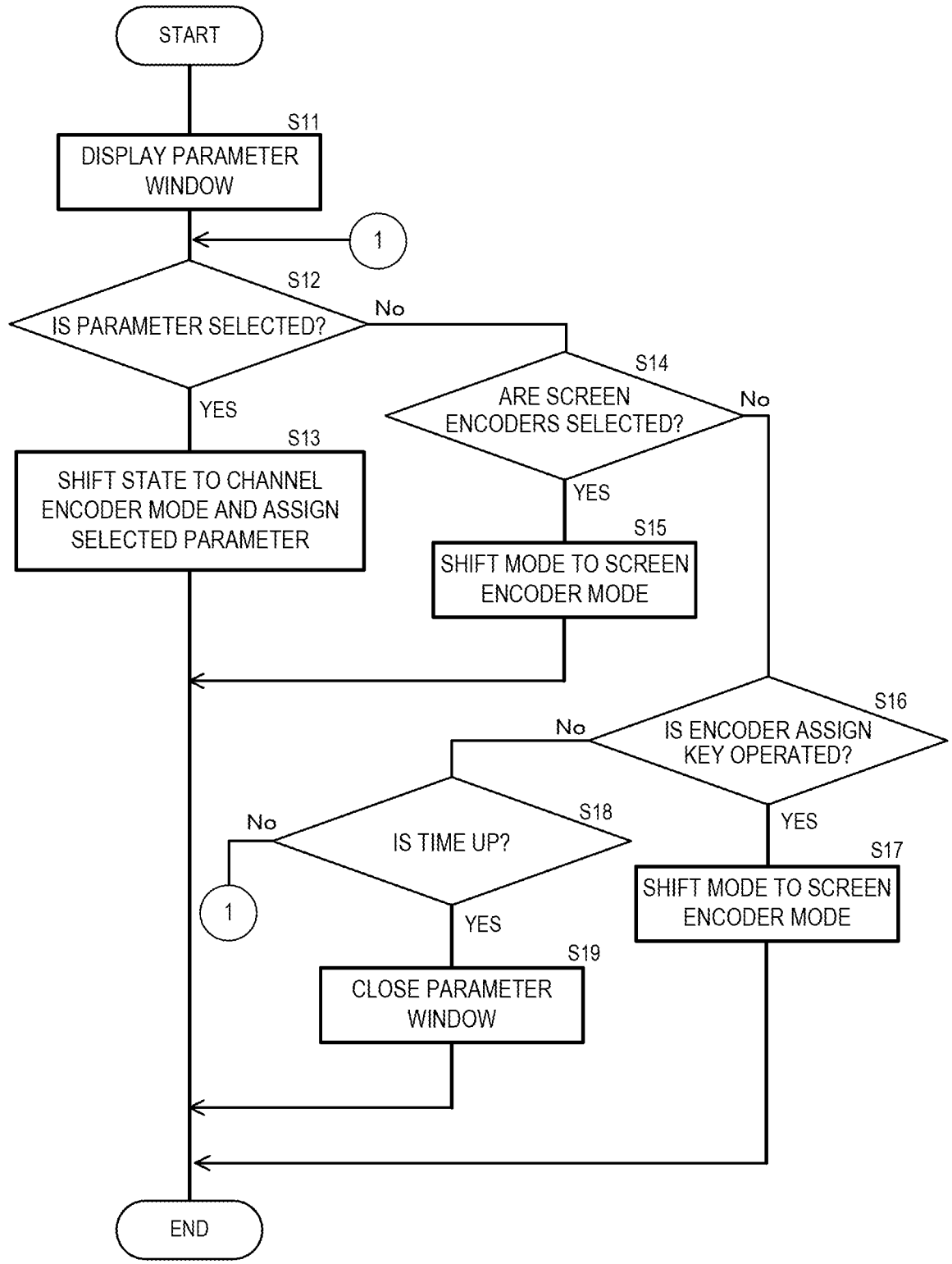
FIG. 13 is a flowchart illustrating an operation of the CPU 106.

FIG. 13 is a flowchart illustrating an operation of the CPU 106. When receiving the operation on the encoder assign key 613, the CPU 106 first displays the screen parameter window 504 on the display 51 (s11).

Figure 11:
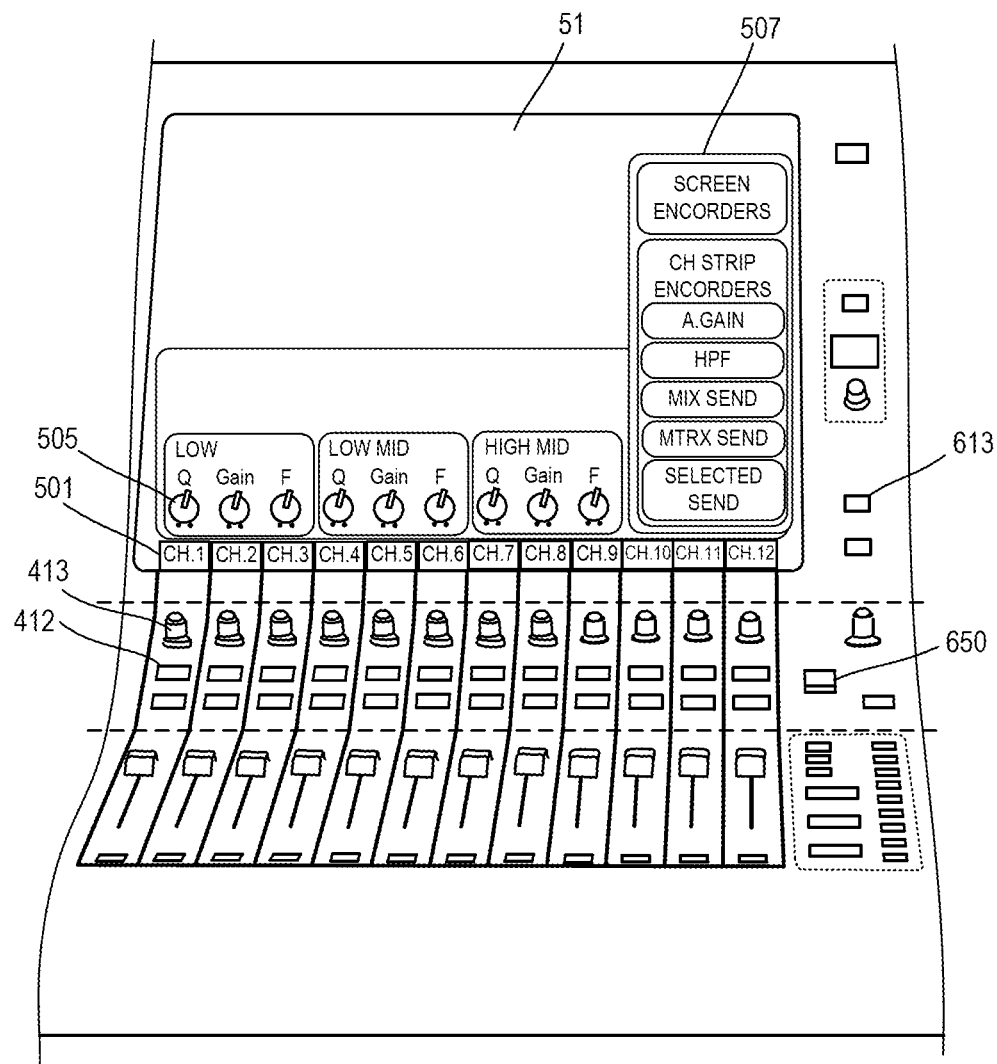
FIG. 11 is a view illustrating a display mode of the display 51 in a state where a parameter assignment window 507 is displayed.

FIG. 11 is a view illustrating a display mode of the display 51 in a state where a parameter assignment window 507 is displayed. When the user operates the encoder assign key 613, the display 51 displays the parameter assignment window 507 as illustrated in FIG. 11. In the example of FIG. 11, the parameter assignment window 507 includes a screen encoder area and a channel strip encoder area. The channel strip encoder area displays a list of parameters to be assigned. In the example of FIG. 11, the channel strip encoder area displays the parameters of an analog gain (A.GAIN), a high-pass filter (HPF), MIX send, matrix (MTRX) send, and selected send. The matrix send is used to collect a plurality of sound signals and route the collected sound signals to a place other than a place for the main output.

When receiving an operation of selecting a parameter to be assigned (for example, an operation of touching the A. GAIN) (S12: YES), the CPU 106 switches to the channel encoder mode illustrated in FIG. 9 and causes the encoder 413 to function as an operation controller that receives the analog gain (S13).

If receiving an operation of touching the high-pass filter (HPF), the MIX send, and the MTRX send, the CPU 106 causes the respective encoders 413 to function as operation controllers that receive a gain of the high-pass filter, a send level to the MIX bus, and a send level to the MTRX bus.

Figure 12:
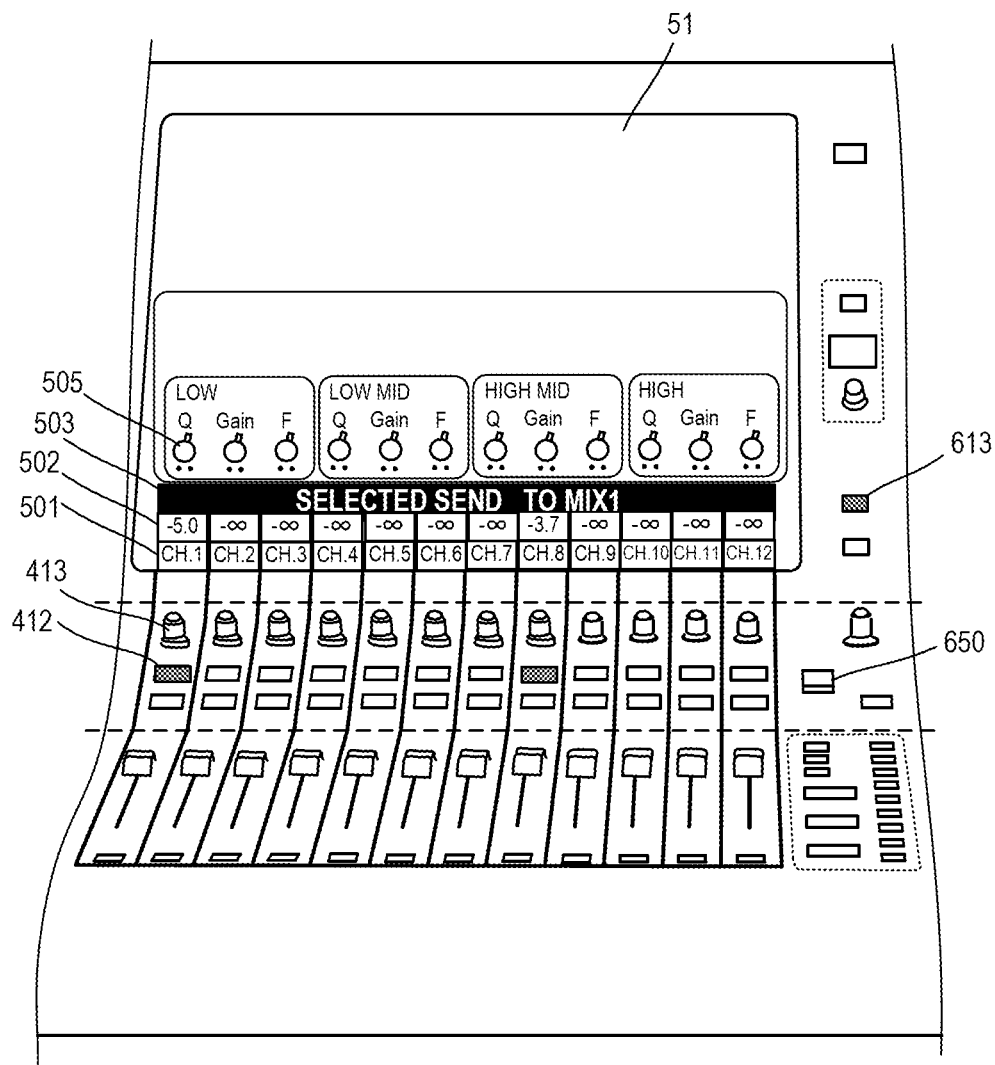
FIG. 12 is a view illustrating a display mode of a display 51 of a selected send state.

Further, when receiving an operation of touching the selected send, the CPU 106 causes the encoder 413 to function as an operation controller configured to receive a send level from the channel selected by the SEL switch 412 to a specific bus as illustrated in FIG. 12. The example of FIG. 12 is a state where send levels from Channel 1 and Channel 8 to the MIX1 bus are received. The parameter name 503 indicates the selected send and also displays a destination bus. The parameter name 503 also displays a destination in the case of the MIX send. For the MTRX send, a name of a source bus is displayed.

On the other hand, when receiving the operation of touching the screen encoder area in the parameter assignment window 507 of FIG. 11 (S12: NO→S14: YES), the CPU 106 switches to the screen encoder mode illustrated in FIG. 10 (S15). Alternatively, when receiving the operation on the encoder assign key 613 again (S14: NO→S16: YES), the CPU 106 switches to the screen encoder mode.

When a predetermined time elapses without any operation (S18: YES), the CPU 106 closes the parameter window 504 (S19) and ends the operation.

Note that the CPU 106 may switch to the screen encoder mode when receiving a touch operation on a place other than the channel strip encoder area in a state where the parameter window 504 is displayed. Further, the CPU 106 may switch to the screen encoder mode when receiving a touch operation on the touch panel in a state where the parameter window 504 is not displayed.

That is, the CPU 106 receives the operation on the encoder assign key 613, and switches to the channel encoder mode only when further receiving the operation of selecting the parameter to be assigned.

Note that the encoder 413 can also receive a push operation. When the user performs a rotation operation while pushing the encoder 413, an operation amount of a parameter with respect to a change in a rotation amount can be set more finely. That is, even if a rotation amount is the same, the CPU 106 receives the rotation amount as a small operation amount when the encoder 413 is operated while being pushed. As a result, the user can perform a more precise operation.

The encoder 413 also functions as an on/off switch for an assigned parameter. For example, when the parameter of the high-pass filter is assigned, the encoder 413 functions as the on/off switch for the high-pass filter. The CPU 106 activates the on/off switch to function when detecting an operation on a specific operation controller and detecting a push operation on the encoder 413.

As illustrated in FIGS. 9 to 12, a shift key 650 is arranged on the right side of the channel strips. The shift key 650 is an example of the specific operation controller. When the shift key 650 is pressed and the CPU 106 detects a push operation on the encoder 413, the push operation is received as a specific operation (on-operation or off-operation of the parameter assigned to the pushed encoder 413). On the other hand, the CPU 106 does not receive the on/off operation when detecting the push operation on the encoder 413 without detecting the operation on the shift key 650.

As a result, the CPU 106 can receive the on/off operation only when the user intentionally pushes the encoder 413, and can ignore an unintended push operation.

The audio mixer 10 of the present embodiment includes one encoder 413 for each of channels in the channel strips. The encoder 413 functions as either a screen encoder or a channel encoder. As a result, the audio mixer 10 is not necessarily provided with the screen encoder and the channel encoder separately. Therefore, the audio mixer 10 can reduce the number of operation controllers. Further, the audio mixer 10 can shorten a depth of the housing, and the display 51 can be brought closer to the user's position. Since the display 51 is brought closer to the user's position, the user can easily determine the name of each channel even if the channel name is not printed on the channel strip. The audio mixer 10 does not need to secure the place where the channel name is printed, and thus, the size of the housing can be further reduced.

Further, the encoder 413 normally functions as the screen encoder. That is, the encoder 413 functions as the channel encoder only when the operation on the encoder assign key 613 is received, and the operation of selecting the parameter to be assigned is further received. Therefore, the user basically uses the encoder 413 as the screen encoder. As a result, the user does not need to determine which encoder is the screen encoder as compared with a case where there are two encoders, and the operation is not mistaken.

[User-Defined Knob]

Figure 15:
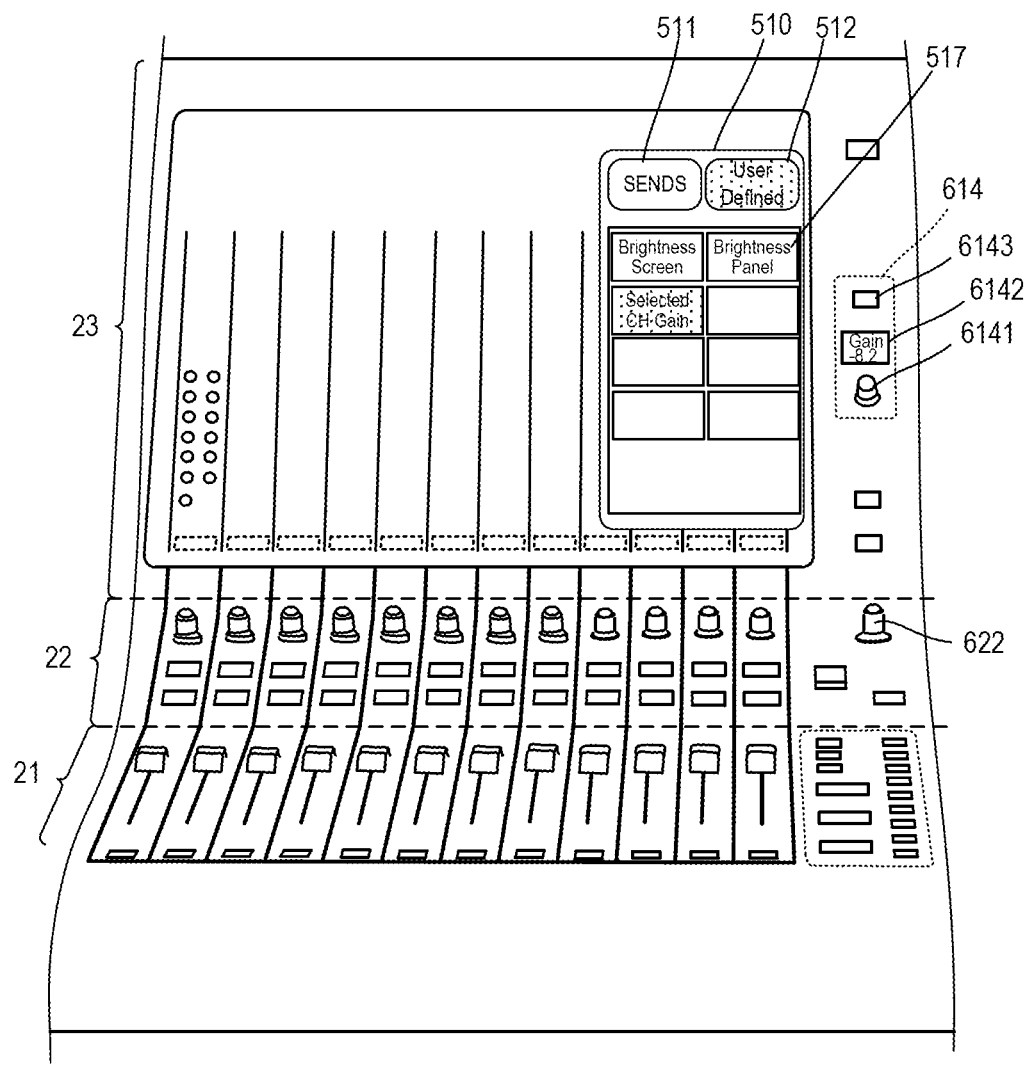
FIG. 15 illustrates the user-defined knob section 614.
Figure 16:
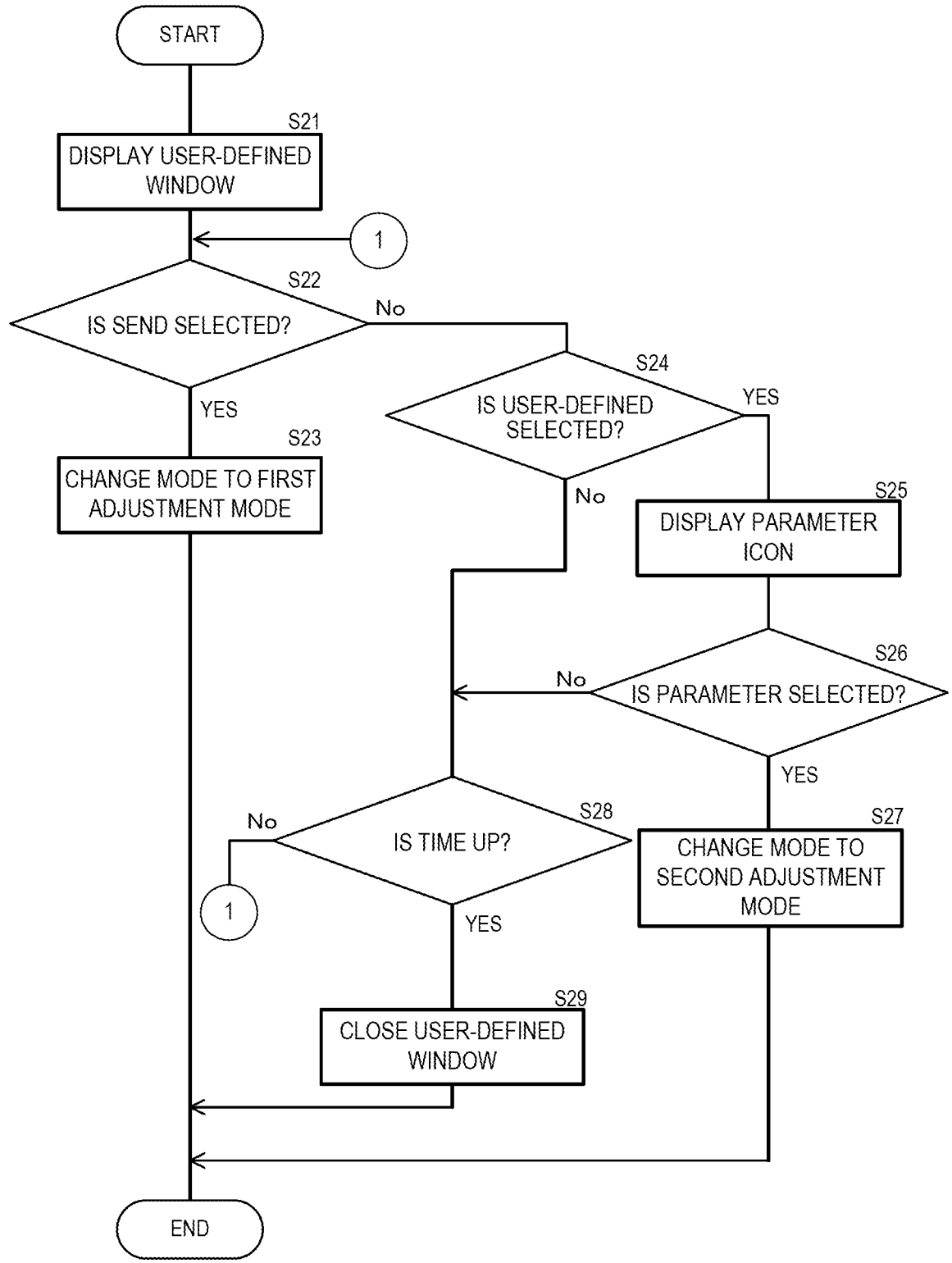
FIG. 16 is a view illustrating an operation of the CPU 106 when a user-defined key 6143 is pressed.

Next, the user-defined knob section 614, the user-defined knob section 624, and the user-defined knob section 634 will be described with reference to FIGS. 14, 15, and 16. Note that the user-defined knob section 614, the user-defined knob section 624, and the user-defined knob section 634 have the same configuration and function, and thus, the user-defined knob sections 614 will be described as a representative in FIGS. 14, 15, and 16.

The user-defined knob section 614 includes a user-defined knob 6141, a knob display 6142, and a user-defined key 6143. The user-defined knob 6141 is a rotary operation controller. However, the user-defined knob 6141 may be another operation controller such as a fader. The user-defined knob 6141 functions as an operation controller configured to adjust a send level to a particular bus (first adjustment mode). Alternatively, the user-defined knob 6141 also functions as an operation controller configured to adjust a certain parameter displayed on the display 51 (second adjustment mode).

The knob display 6142 is a simple display that is relatively smaller than the display 51. The knob display 6142 displays a function assigned to the user-defined knob 6141 and an adjustment amount of the function.

The user-defined key 6143 is a press button. When the user presses the user-defined key 6143, the CPU 106 displays an image (user-defined window 510) for selection on whether to set the user-defined knob 6141 to the first adjustment mode or the second adjustment mode on the display 51 (S21).

The user-defined window 510 includes a send tab image 511 and a user-defined tab image 512. When the user touches the send tab image 511 (S22: YES), the CPU 106 changes the mode to the first adjustment mode illustrated in FIG. 14 (S23).

In the first adjustment mode, the display 51 displays a scroll bar 513 and a bus selection image 514 in the user-defined window 510. In the bus selection image 514, a plurality of buses and send levels to the respective buses are displayed. In FIG. 14, MIX1 to MIX5 buses are displayed. When the user swipes the scroll bar 513 up or down, other MIX buses are displayed. The user selects any bus from the bus selection image 514. In the example of FIG. 14, the MIX2 bus is selected. Therefore, the CPU 106 causes the user-defined knob 6141 to function as an operation controller configured to adjust a send level to the MIX2 bus. Note that a signal to be sent to the MIX2 bus is a signal of a channel selected in a bay (or a component to be described later) to which the user-defined knob 6141 belongs. For example, the user touches any channel on a channel overview screen displayed on the touch panel to set the channel in the selected state. Further, channels selected by the plurality of SEL switches 412 are also signals to be sent to the MIX bus 2. Further, when a SEL link is set between a plurality of components, which will be described later, a signal is set to the MIX2 bus for any channel selected by touching the channel or a channel selected by the SEL switch in the other components.

In the first adjustment mode, the CPU 106 changes a send level to a selected bus in response to a rotation position of the user-defined knob 6141. The CPU 106 displays the selected bus and the send level on the knob display 6142. Therefore, the user can grasp the bus assigned to the user-defined knob 6141 and the send level even when the user-defined window 510 is closed.

Note that the CPU 106 may assign the same function as the user-defined knob 6141 to the touch and turn knob 612 in the first adjustment mode. Further, the CPU 106 may assign a specific parameter to the touch and turn knob 612 when the specific parameter displayed on the display 51 is touched in the first adjustment mode.

Figure 14:
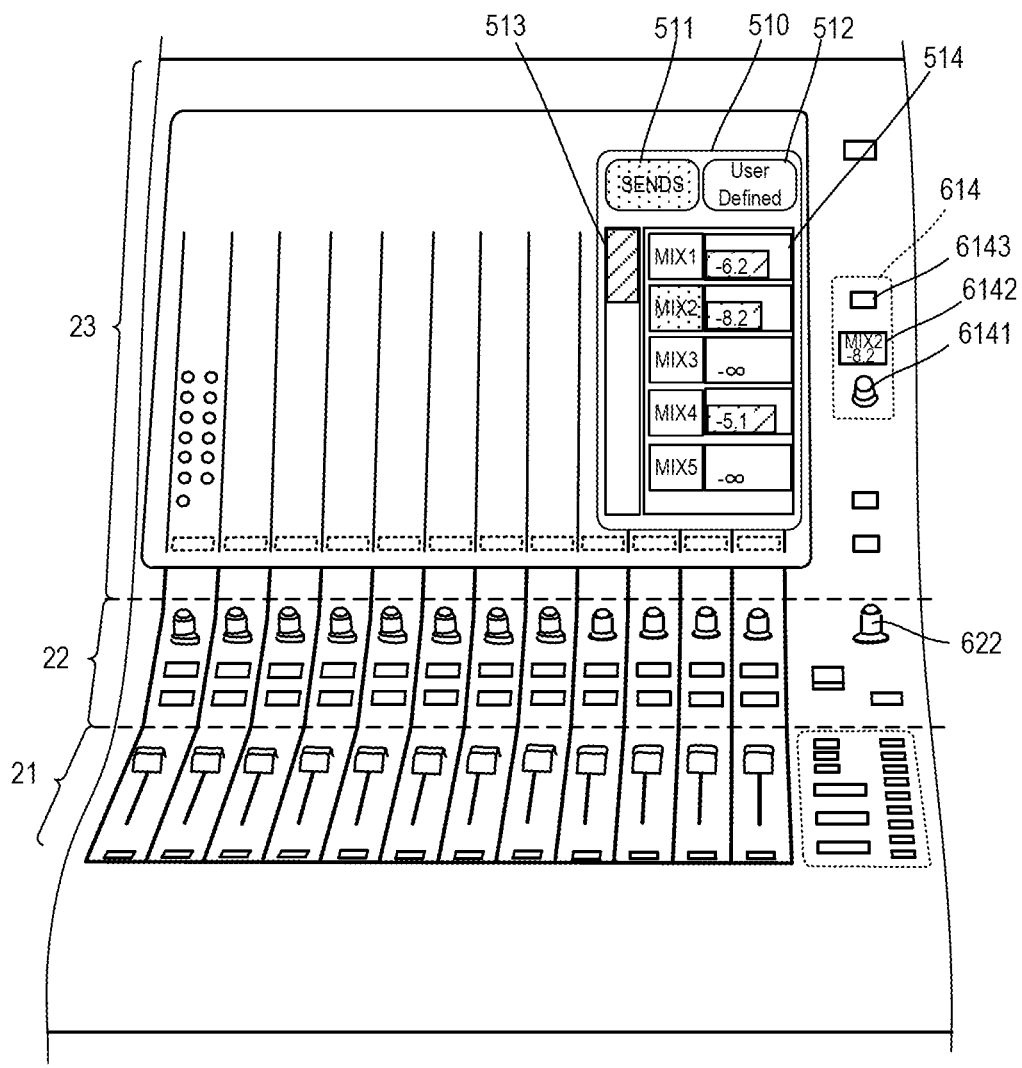
FIG. 14 illustrates a user-defined knob section 614.

Note that FIG. 14 illustrates the example in which the user-defined knob 6141 functions as the operation controller configured to adjust the send level with respect to the MIX bus. However, the CPU 106 may cause the user-defined knob 6141 to function as an operation controller configured to adjust a send level with respect to another type of bus such as the MATRIX bus. In the case of the MATRIX bus, the user-defined knob 6141 functions as an operation controller configured to adjust a send level from the MIX bus for each source MIX bus.

On the other hand, when the user touches the user-defined tab image 512 (S22: NO→S24: YES), the CPU 106 displays parameter icons 517 as illustrated in FIG. 15 (S25). In the example of FIG. 15, the display 51 displays a screen brightness icon, a panel brightness icon, and a selected channel gain icon. Of course, the display 51 may also display other parameters. Further, the display 51 may display a bank tab image (for example, tabs of Banks 1 to 4) and switch the tabs such that a plurality of parameters can be further displayed.

Then, when the user touches the parameter icon 517 to select a parameter (S26: YES), the CPU 106 changes the mode to the second adjustment mode (S27).

When a predetermined time elapses without any operation (S28: YES), the CPU 106 closes the user-defined window 510 (S29) and ends the operation.

In the second adjustment mode, a parameter assigned to the user-defined knob 6141 is the parameter defined by the user. In the example of FIG. 15, the selected channel gain icon is selected. Therefore, the user-defined knob 6141 functions as an operation controller that adjusts a gain of a channel selected by the SEL switch 412.

However, the user-defined knob 6141 may automatically assign a parameter other than the parameter defined by the user. For example, the user-defined knob 6141 may automatically assign the most frequently used parameter.

In the above example, the audio mixer 10 includes a physical operation controller (the user-defined key 6143) configured to receive the designation of the first adjustment mode and the designation of the second adjustment mode, and the CPU 106 receives the designation of the first adjustment mode or the designation of the second adjustment mode via the mode operation controller or the receiver (touch panel) after receiving the operation on the user-defined key 6143. However, the user-defined key 6143 is not essential. For example, the CPU 106 may display an icon image on the display 51 to call out the user-defined window 510, and call out the user-defined window 510 when receiving a touch operation on the icon image.

The audio mixer 10 is provided with the plurality of displays 51, 52, and 53 for a plurality of users. The audio mixer 10 arranges the user-defined knob sections 614, 624, and 634 in the vicinity of the respective edges of the displays 51, 52, and 53. Therefore, the plurality of users can operate their respective user-defined knobs. Further, the audio mixer 10 displays target buses on the display and receives the selection of any bus in the first adjustment mode. As a result, the audio mixer 10 reduces the number of operation controllers.

[Custom Fader Bank]

A custom fader bank will be described with reference to FIGS. 17 to 20. In the custom fader bank, a user can assign any channel desired by the user to each of the plurality of faders 31, 32, 33. The custom fader bank can be used by operating the bank selection sections 611, 621, and 631. The CPU 106 functions as a channel determiner that determines a channel to be assigned to a fader.

Figure 17:
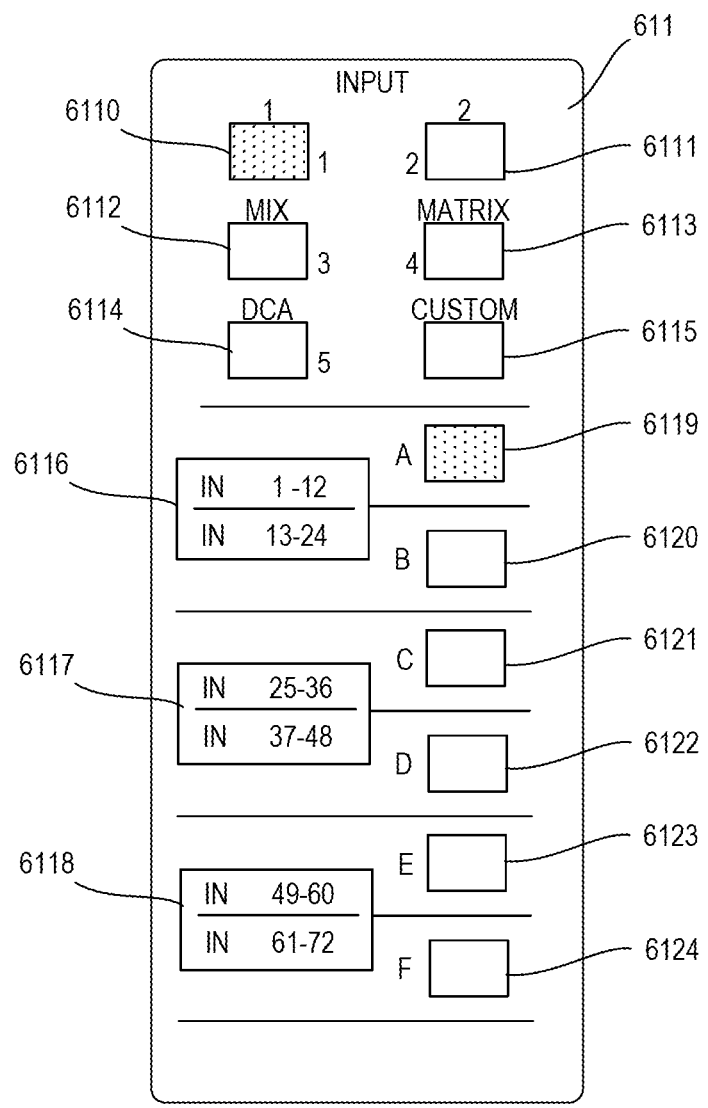
FIG. 17 is a view illustrating a fixed mode.
Figure 18:
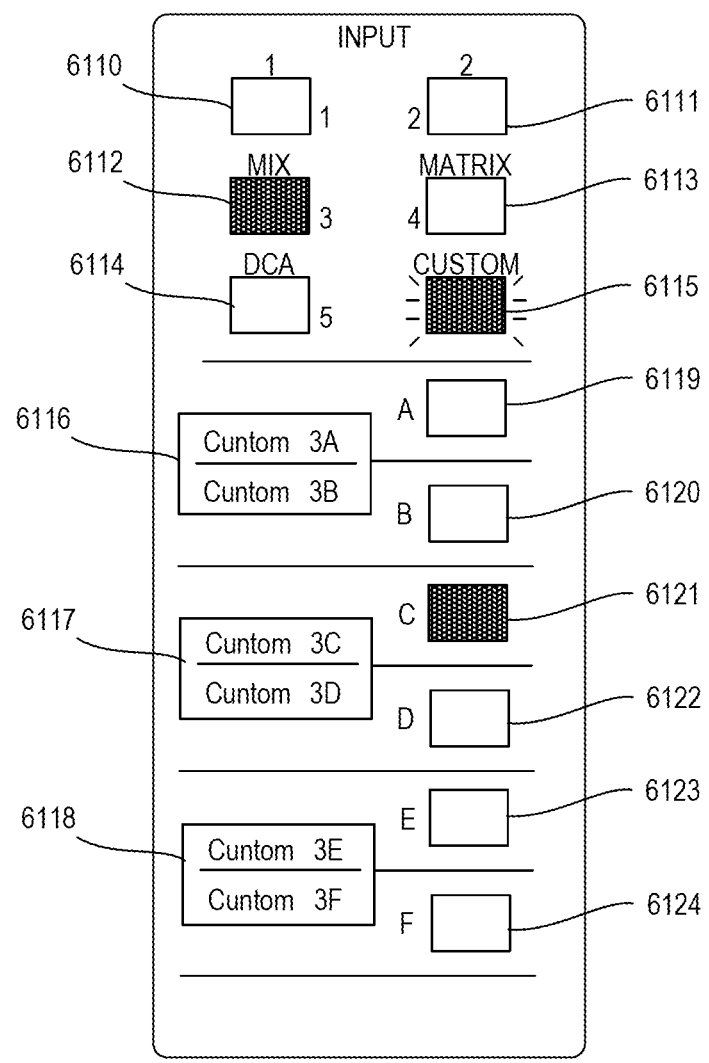
FIG. 18 is a view illustrating a custom mode.
Figure 19:
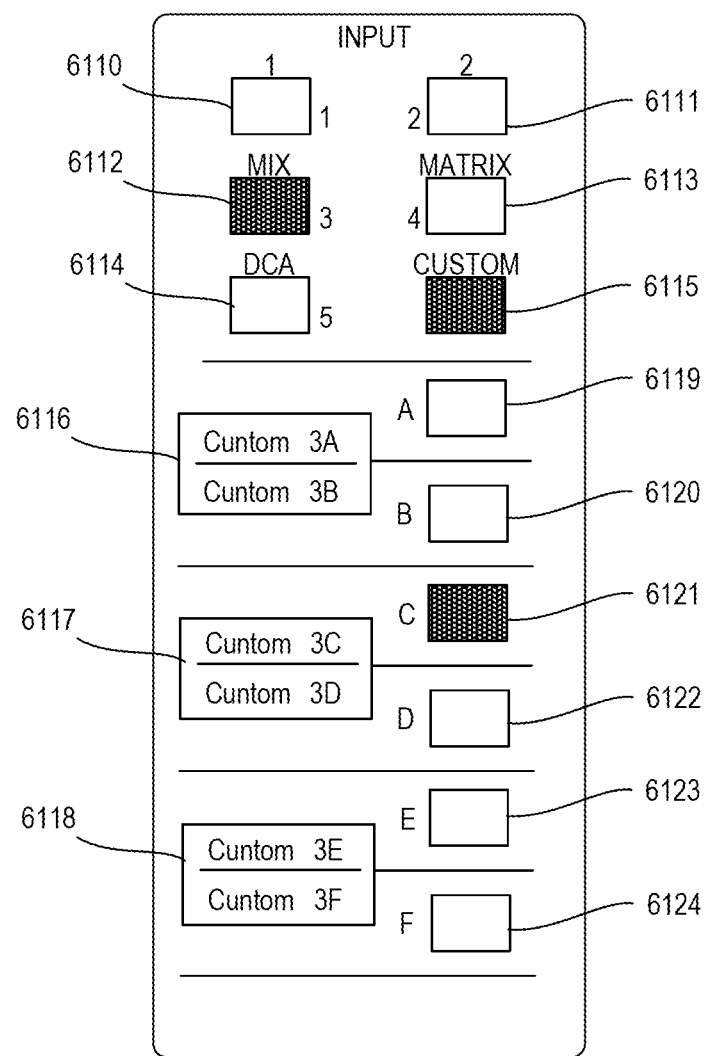
FIG. 19 is a view illustrating the custom mode.

Nota that the bank selection sections 611, 621, and 631 have the same configuration and function. Therefore, the bank selection section 611 will be described as a representative in FIGS. 17 to 20. FIG. 17 illustrates a fixed fader bank mode (hereinafter referred to as a fixed mode) in which the channels assigned to the respective faders are fixed, and FIGS. 18 and 19 illustrate a custom fader bank mode (hereinafter referred to as a custom mode).

The bank selection section 611 includes a first fixed bank switch 6110, a second fixed bank switch 6111, a MIX switch 6112, a MATRIX switch 6113, a DCA switch 6114, a CUSTOM switch 6115, layer displays 6116, 6117, and 6118, and layer switches 6119, 6120, 6121, 6122, 6123, and 6124.

The first fixed bank switch 6110 is arranged on the uppermost left side of the bank selection section 611. The second fixed bank switch 6111 is arranged on the uppermost right side of the bank selection section 611. The MIX switch 6112 is arranged below the first fixed bank switch 6110. The MATRIX switch 6113 is arranged below the second fixed bank switch 6111. The DCA switch 6114 is arranged below the MIX switch 6112. The CUSTOM switch 6115 is arranged below the MATRIX switch 6113.

The layer switches 6119, 6120, 6121, 6122, 6123, and 6124 are arranged downward in this order below the CUSTOM switch 6115.

The layer display 6116 is arranged on the left side of the layer switch 6119 and the layer switch 6120. The layer display 6117 is arranged on the left side of the layer switch 6121 and the layer switch 6122. The layer display 6118 is arranged on the left side of the layer switch 6123 and the layer switch 6124.

When the first fixed bank switch 6110 is pressed, the CPU 106 displays input channels of 1 to 72 on the layer display 6116, 6117, and 6118.

The layer display 6116 displays 1 to 12 next to the layer switch 6119, that is, above a display area. The layer display 6116 displays 13 to 24 next to the layer switch 6120, that is, below the display area. The layer display 6117 displays 25 to 36 next to the layer switch 6121, that is, above a display area. The layer display 6117 displays 37 to 48 next to the layer switch 6122, that is, below the display area. The layer display 6118 displays 49 to 60 next to the layer switch 6123, that is, above a display area. The layer display 6118 displays 61 to 72 next to the layer switch 6124, that is, below the display area.

When the second fixed bank switch 6111 is pressed, the CPU 106 displays input channels of 73 to 144 on the layer displays 6116, 6117, and 6118. The same display mode is applied as the input channel of 1-72 described above.

In the example of FIG. 17, the layer switch 6119 is pressed. Therefore, the CPU 106 assigns the input channels of 1 to 12 in order from the left side of the twelve faders 31. If the layer switch 6120 is pressed, the CPU 106 assigns the input channels of 13 to 24 in order from the left side of the twelve faders 31.

The MIX switch 6112 and the MATRIX switch 6113 correspond to an output-side layer. When the user presses the MIX switch 6112 and presses the layer switch 6119, the CPU 106 assigns MIX1 to MIX12 in order from the left side of the twelve faders 31. When the DCA switch 6114 is pressed, the CPU 106 assigns DCA1 to DCA12 in order from the left side of the twelve faders 31.

When the user presses the CUSTOM switch 6115, the CPU 106 shifts to the custom mode illustrated in FIG. 18 or 19. The custom mode has two states, that is, a first state and a second state. FIG. 18 is a view illustrating the custom mode in the first state, and FIG. 19 is a view illustrating the custom mode in the second state. In the first state, the CUSTOM switch 6115 lights up. In the second state, the CUSTOM switch 6115 lights up.

When the user briefly presses the CUSTOM switch 6115 in the fixed mode, the CPU 106 shifts to the custom mode in the first state. The first state is a state where the fixed mode is restored when the CUSTOM switch 6115 is pressed for a short time.

When the user presses the CUSTOM switch 6115 for a long time in the fixed mode, the CPU 106 shifts to the custom mode in the second state. The second state is a state where the fixed mode is restored when the CUSTOM switch 6115 is pressed for a long time. In the second state, the fixed mode is not restored even if the CUSTOM switch 6115 is pressed for a short time. Further, the CPU 106 may shift to the second state when the user presses the CUSTOM switch 6115 for a long time in the custom mode in the first state.

Figure 20:
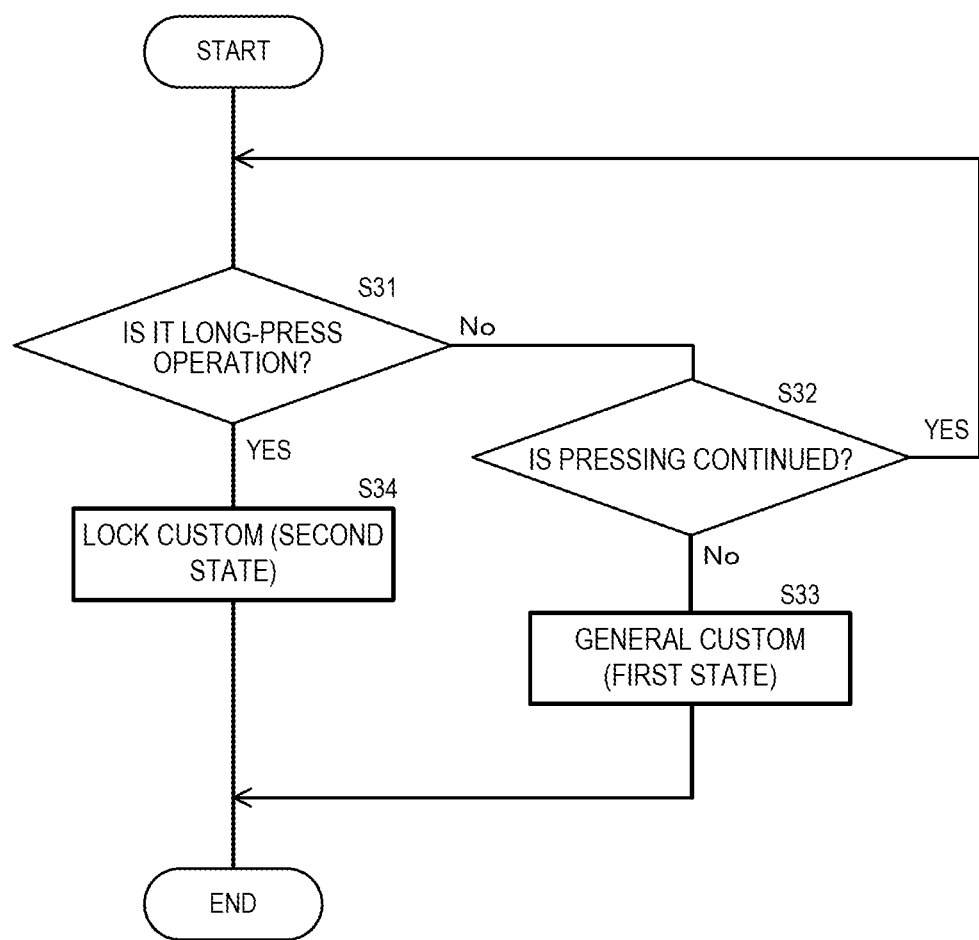
FIG. 20 is a flowchart illustrating an operation of the CPU 106 when shifting from the fixed mode to the custom mode.

FIG. 20 is a flowchart illustrating an operation of the CPU 106 when shifting from the fixed mode to the custom mode. When the user presses the CUSTOM switch 6115, the CPU 106 determines whether the operation is a long-press operation (S31: YES) or a short-time operation (S31: NO→S32: YES). The long-press operation is, for example, a state where the CUSTOM switch 6115 is continuously pressed for 500 msec or longer. The short-time operation is, for example, a state where the pressing of the CUSTOM switch 6115 is released in less than 500 msec.

If the time for which the CUSTOM switch 6115 is pressed is less than 500 msec, the CPU 106 shifts to the custom mode in the first state (S33). If the time for which the CUSTOM switch 6115 is pressed is equal to or longer than 500 msec, the CPU 106 shifts to the custom mode in the second state (S34).

When shifting to the custom mode, the CPU 106 causes the CUSTOM switch 6115 to light up or blink as described above. The CPU 106 causes the CUSTOM switch 6115 to blink in the first state. The CPU 106 causes the CUSTOM switch 6115 to light up in the second state. As a result, the user can easily determine whether the current state is the first state or the second state in the custom mode.

In the custom mode, each of the first fixed bank switch 6110, the second fixed bank switch 6111, the MIX switch 6112, the MATRIX switch 6113, and the DCA switch 6114 functions as the layer switch. The first fixed bank switch 6110 functions as the switch of Layer 1. The second fixed bank switch 6111 functions as the switch of Layer 2. The MIX switch 6112 functions as the switch of Layer 3. The MATRIX switch 6113 functions as the switch of Layer 4. The DCA switch 6114 functions as the switch of Layer 5.

The user presses any of the switches of Layers 1 to 5 and presses any of the layer switches 6119, 6120, 6121, 6122, 6123, and 6124. In the examples of FIGS. 18 and 19, the MIX switch 6112 (that is, the switch of Layer 3) and the layer switch 6121 are pressed. Therefore, the CPU 106 assigns a channel to each fader according to the relationship between the fader and the channel managed in Layer 3-C.

That is, the audio mixer 10 of the present embodiment has thirty layers obtained by multiplying the five layer switches (first fixed bank switch 6110, second fixed bank switch 6111, MIX switch 6112, MATRIX switch 6113, and DCA switch 6114) and six layer switches 6119, 6120, 6121, 6122, 6123, and 6124 in the custom mode. The audio mixer 10 can increase the number of layers without increasing the number of physical operation controllers by causing the first fixed bank switch 6110, the second fixed bank switch 6111, the MIX switch 6112, the MATRIX switch 6113, and the DCA switch 6114 to function as the layer switches.

Figure 21:
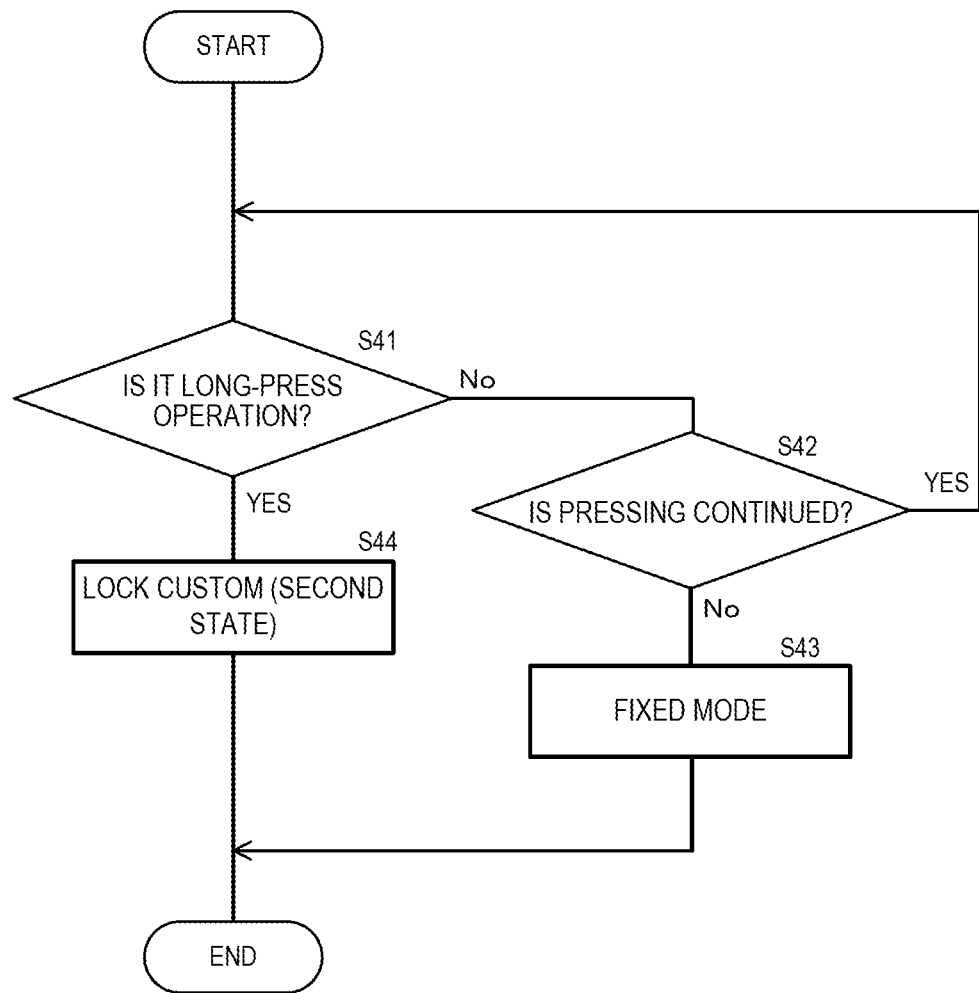
FIG. 21 is a flowchart illustrating an operation of the CPU 106 when a user presses a CUSTOM switch 6115 in the custom mode in a first state.

FIG. 21 is a flowchart illustrating an operation of the CPU 106 when the user presses the CUSTOM switch 6115 in the custom mode in the first state.

The CPU 106 determines whether the operation is the long-press operation (S41: YES) or the short-time operation (S41: NO→S42: YES). When the CPU 106 determines that it is the short-time operation, the fixed mode is restored (S43). In the case of the long-press operation, the CPU 106 shifts to the custom mode in the second state (S44).

Figure 22:
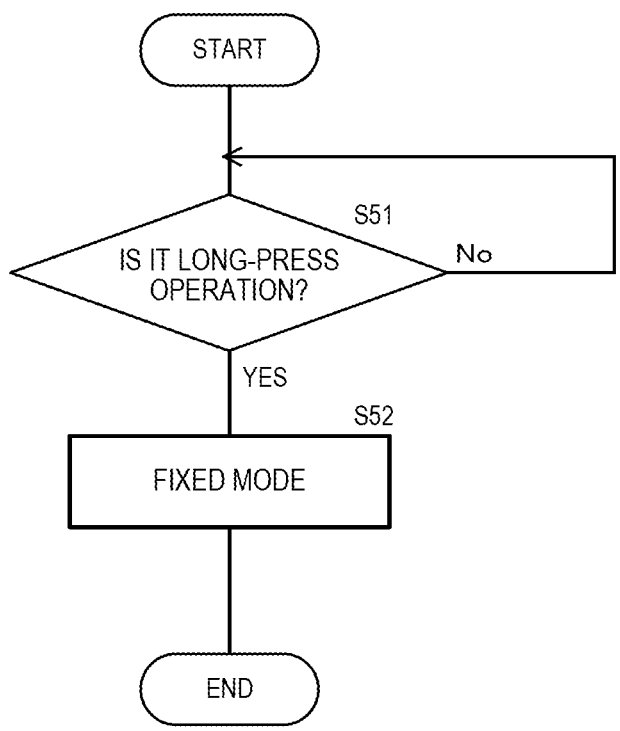
FIG. 22 is a flowchart illustrating an operation of the CPU 106 when a user presses the CUSTOM switch 6115 in the custom mode in a second state.

FIG. 22 is a flowchart illustrating an operation of the CPU 106 when the user presses the CUSTOM switch 6115 in the custom mode in the second state.

The CPU 106 determines whether or not an operation is the long-press operation (S51). In the case of the long-press operation, the CPU 106 shifts to the custom mode in the second state (S52). That is, the fixed mode is not restored unless the CUSTOM switch 6115 is pressed for a long time in the custom mode in the second state.

Since a user who mainly uses the custom mode rarely uses the fixed mode, it is preferable that the audio mixer not be returned to the fixed mode. On the other hand, a user who uses both the custom mode and fixed mode desires to easily switch from the custom mode to the fixed mode. The audio mixer 10 of the present embodiment returns to the fixed mode in the first state only by pressing the CUSTOM switch 6115 for a short time as a first operation. The audio mixer 10 returns to the fixed mode in the second state only when the CUSTOM switch 6115 is pressed for a long time as a second operation. In this manner, the user can select the first state where the fixed mode is easily restored and the second state where it is difficult to restore the fixed mode. The audio mixer 10 can switch from the custom mode to the fixed mode with an operation in response to the user's request.

Note that the CUSTOM switch 6115 is pressed for a short time as the first operation, and the CUSTOM switch 6115 is pressed for a long time as the second operation in the above example. That is, the second operation is a relatively complicated operation as compared with the first operation. The second operation may be an operation that requires a relatively longer time than the first operation. However, the second operation is not necessarily the relatively complicated operation as compared with the first operation in the present disclosure. For example, the first operation may be a double touch.

Note that the fixed mode and the custom mode in the first state are switched by the first operation of pressing the CUSTOM switch 6115 for a short time in the above example. However, the operation of returning from the custom mode in the first state to the fixed mode and the operation of shifting from the fixed mode to the first state (first shift operation) may be different operations.

Further, the fixed mode and the custom mode in the second state are switched by the second operation of pressing the CUSTOM switch 6115 for a long time in the above example. However, the operation of returning from the custom mode in the second state to the fixed mode and the operation of shifting from the fixed mode to the second state (second shift operation) may be different operations.

Further, the shift from the first state to the second state is made by the second operation of pressing the CUSTOM switch 6115 for a long time in the above example. However, the operation of making the shift from the first state to the second state may be another operation (third shift operation).

[Link Function]

Next, a link function will be described with reference to the front view of FIG. 23.

Figure 23:
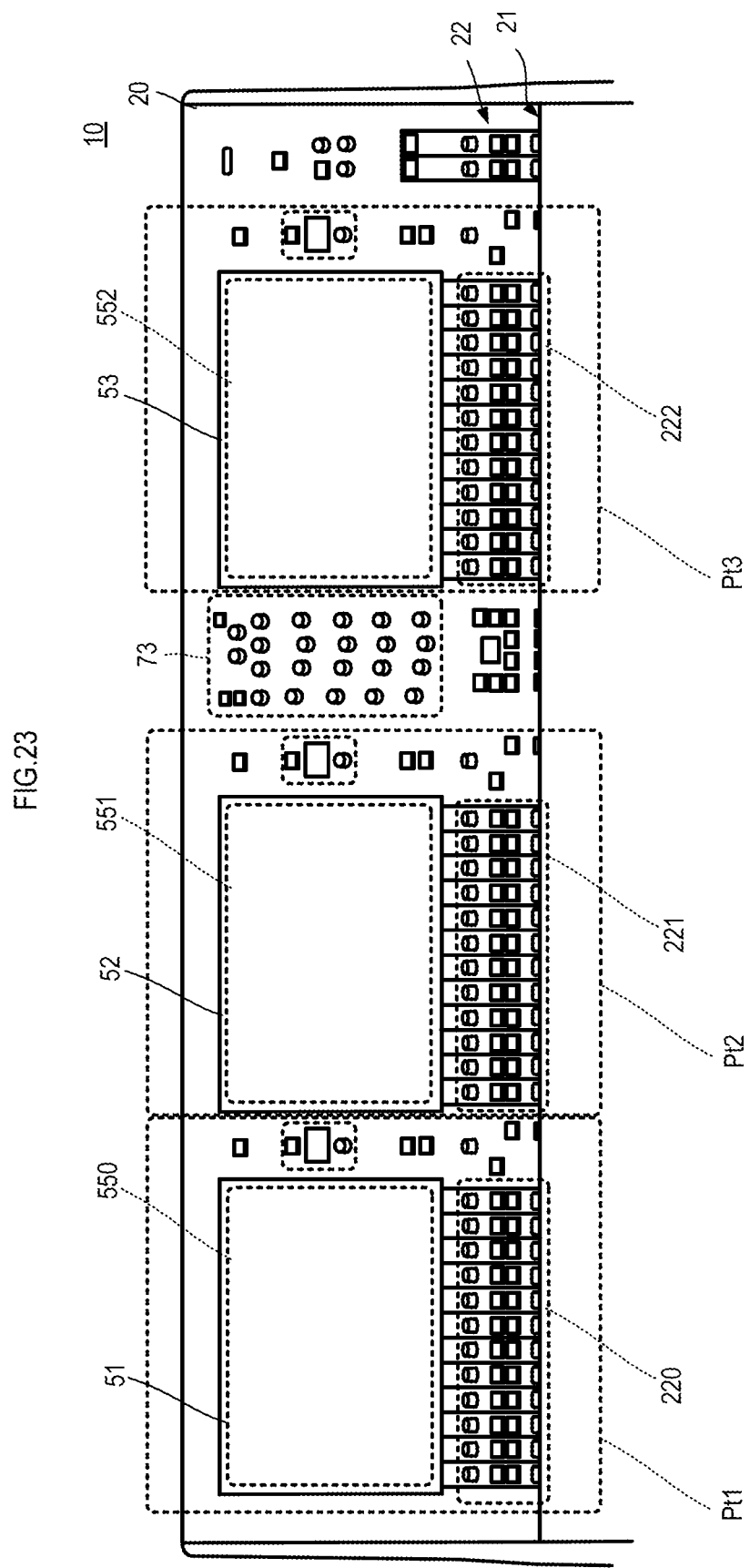
FIG. 23 is a front view of the audio mixer.

In FIG. 23, the first operation portion Pt1, the second operation portion Pt2, and the third operation portion Pt3 are referred to as a first bay Pt1, a second bay Pt2, and a third bay Pt3, respectively.

The first bay Pt1 has a first component 550 including the touch panel laminated on the display 51, and a second component 220 including a group of operation controllers arranged on the first surface 21 and the second surface 22. The second bay Pt2 has a third component 551 including the touch panel laminated on the display 52, and a fourth component 221 including a group of operation controllers arranged on the first surface 21 and the second surface 22. The third bay Pt3 has a fifth component 552 including the touch panel laminated on the display 53, and a sixth component 222 including a group of operation controllers arranged on the first surface 21 and the second surface 22.

Figure 24:
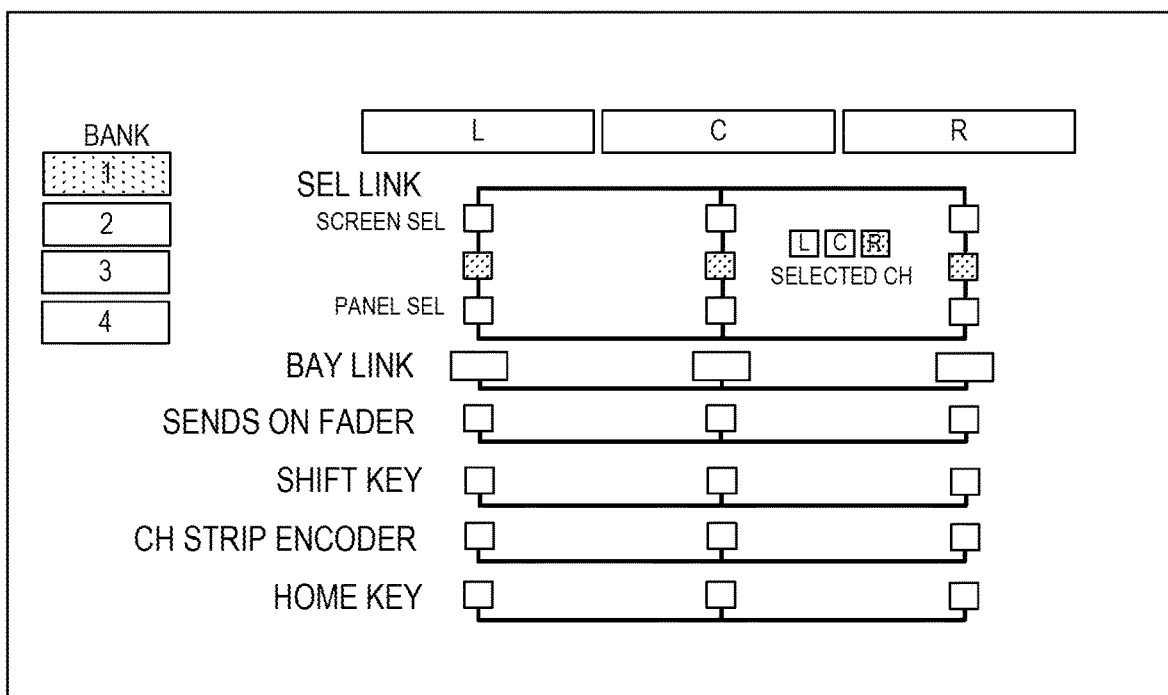
FIG. 24 is a view illustrating an example of a link setting screen displayed on any of displays 51, 52, and 53.

FIG. 24 is a view illustrating an example of a link setting screen displayed on any of displays 51, 52, and 53. On the link setting screen, images of an L bay, a C bay, and an R bay are displayed so as to correspond to the first bay Pt1, the second bay Pt2, and the third bay Pt3, respectively. On the link setting screen, icon images configured to receive settings of links among the components are displayed below the images of L, C, and R.

The link includes synchronization of operations performed by the user on the respective components between the components. Further, the link includes synchronization responses to the operations performed by the user on the respective components (for example, display contents of displays and positions of faders) between the components.

At the top of the link setting screen, an image configured to receive settings of a SEL link is displayed. The SEL link means a link of a channel selected by the plurality of SEL switches 412, 422, and 432. For example, if the SEL link is set in the first component 550 and the third component 551, the same channel is selected in the first component 550 and the third component 551. The SEL link displays an icon (square) image configured to select a screen SEL and a panel SEL for each bay. The user touches these icon images to set the SEL link.

Further, an icon (square) image is also displayed between the screen SEL and the panel SEL for each bay on the link setting screen. These icon (square) images mean that the display 51 and a panel on which a group of operation controllers such as faders are arranged can be used for each bay. For example, when the icon image arranged between the screen SEL and panel SEL of each of the L bay, the C bay, and the R bay is touched and selected as illustrated in FIG. 24, the audio mixer 10 can be used by different users for the L bay, the C bay, and the R bay, respectively. For example, the user of the L bay uses the first component 550 and the second component 220. The user of the C bay uses the third component 551 and the fourth component 221. The user of the R bay uses the first component 550 and the second component 220.

An icon image of "SELECTED CH" arranged between the C bay and the R bay is an icon image configured to select a display that displays parameters operated by operation controllers in the selected channel section 73. In the example of FIG. 24, R is selected. Therefore, the parameters operated by the operation controllers in the selected channel section 73 are displayed on the display 53. Further, the audio mixer 10 may change operation controllers of the selected channel section 73 when parameters displayed on the display 53 are changed.

Figure 25:
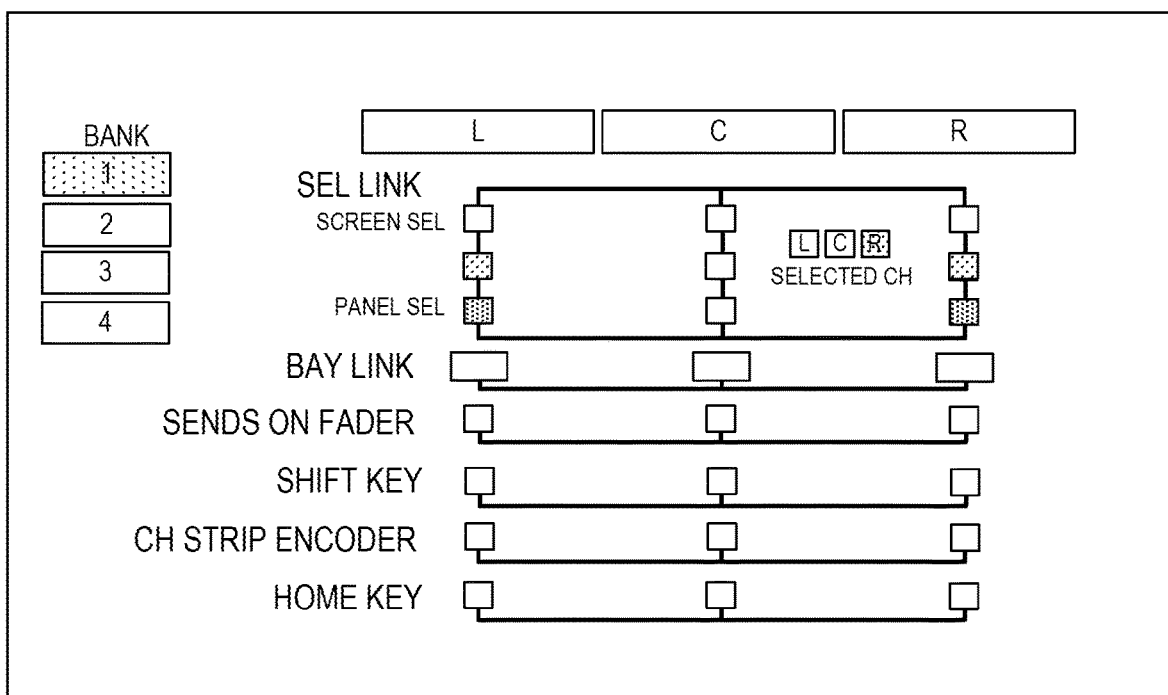
FIG. 25 is a view illustrating an example of the link setting screen.

Next, the panel SEL of the L bay and the panel SEL of the R bay are selected in the example of FIG. 25. Further, the icon between the screen SEL and panel SEL of the L bay is also selected. Further, the icon between the screen SEL and panel SEL of the R bay is also selected. In this case, the second component 220 and the sixth component 222 are linked.

In this case, for example, the same fader bank is selected in the second component 220 and the sixth component 222 as illustrated in FIG. 26. When the same fader bank is selected in this manner, responses to operations performed by the user on the respective components are synchronized between the components. For example, the user selects Input Channel 1 with the SEL switch 412 to change parameters in the second component 220, the SEL switch 432 of Input Channel 1 of the sixth component 222 is also selected and parameters are changed. Conversely, when the user selects a specific input channel with the SEL switch 412 to change parameters in the sixth component 222, the same input channel is selected in the SEL switch 412 of the second component 220 and parameters are changed.

In this case, the C bay can be used independently. Therefore, for example, parameters of an output channel may be set in the third component 551 and the fourth component 221 of the C bay. The user of the C bay can also operate the selected channel section 73 to operate parameters on an input channel side while operating the parameters of the output channel using the third component 551 and the fourth component 221.

Figure 27:
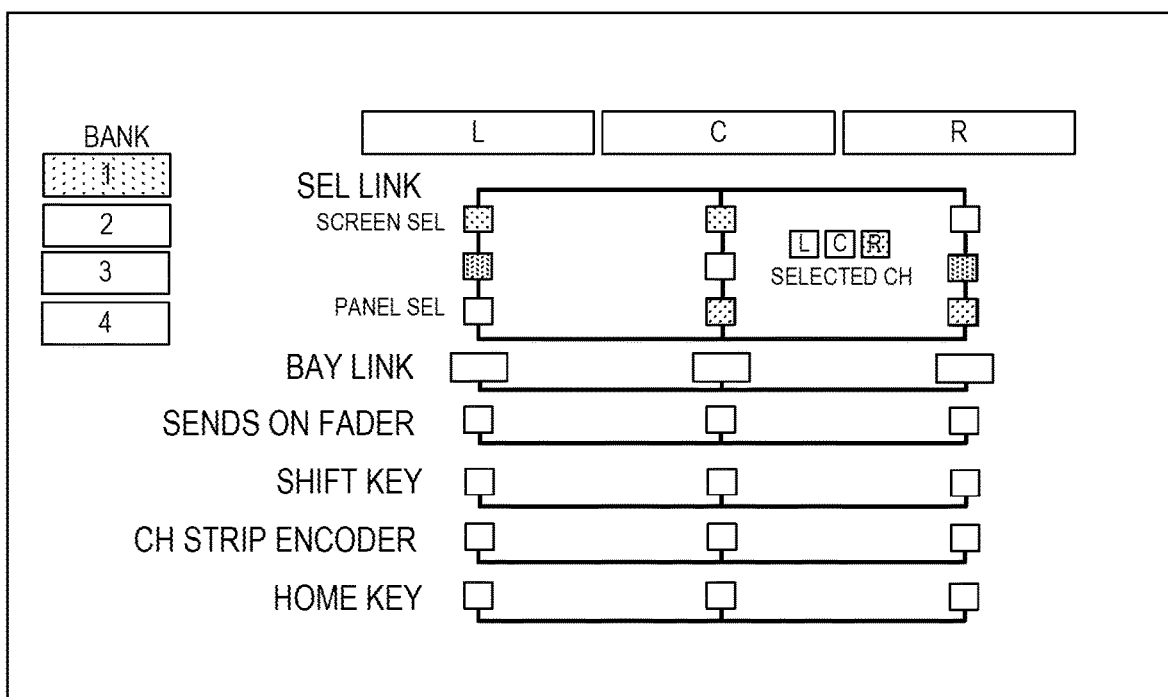
FIG. 27 is a view illustrating an example of the link setting screen.

In the example of FIG. 27, the screen SEL of the L bay and the screen SEL of the C bay are selected. Further, the panel SEL of the C bay and the panel SEL of the R bay are selected. Further, the icon between the screen SEL and panel SEL of the L bay is also selected. Further, the icon between the screen SEL and panel SEL of the R bay is also selected. In this case, the first component 550 and the third component 551 are linked, and the fourth component 221 and the sixth component 222 are linked.

Figure 28:
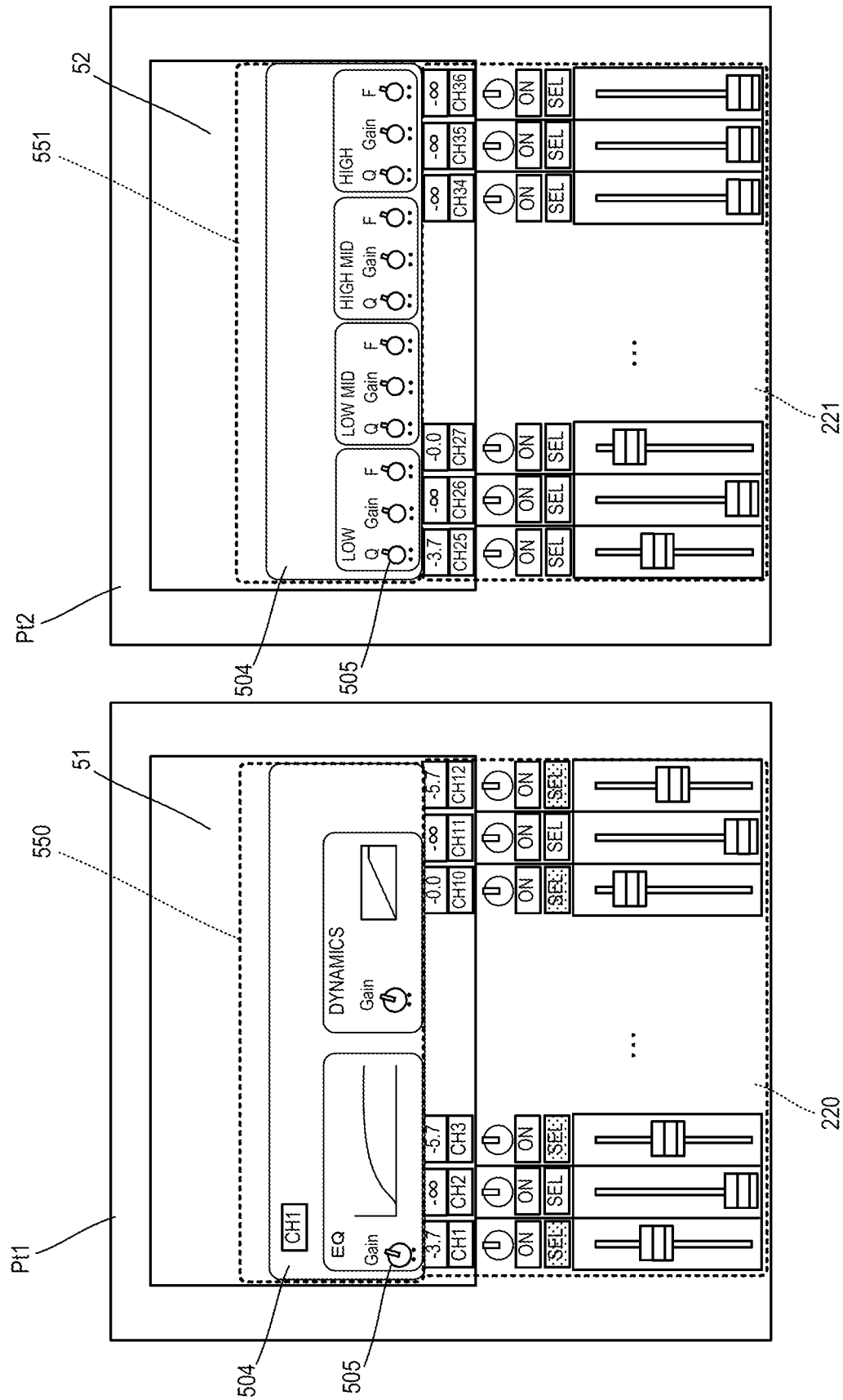
FIG. 28 is a view illustrating the first bay Pt1 and a second bay Pt2.

In this case, the respective operation controllers of the second component 220 and the fourth component 221 function as operation controllers for different channels as illustrated in FIG. 28. However, the first component 550 (display 51) and the third component 551 (display 52) can be used as displays for the operation on the second component 220.

This example is suitable when two users perform operations at the same time. For example, a user on the left side can refer to parameters of a specific input channel (for example, Input Channel 1) on the display 51 of the first component 550 and refers to details of a specific effect on the display 52 of the third component 551 while operating the input channel with the second component 220. A user on the right side can perform an operation while referring to the display 53 of the fifth component 552 using the operation controllers on the selected channel section 73, the fourth component 221, and the sixth component 222.

The embodiment can be conceptualized as a technical idea as follows.

An operation panel for an audio processing apparatus, which includes: a first bay (the L bay) having a first component (the first component 550 or second component 220) that includes at least a user interface; a second bay (the C bay) having a second component (the third component 551 or fourth component 221) that includes at least a user interface; and a third bay (the R bay) having a third component (the fifth component 552 or sixth component 222) that includes at least a user interface, the operation panel for the audio processing apparatus including a link receiver linking the first component (first component 550 or second component 220) of the first bay (L bay) and the third component (fifth component 552 or sixth component 222) of the third bay (R bay), the first bay (L bay) and the second bay (C bay) being adjacent to each other, the second bay (C bay) and the third bay (R bay) being adjacent to each other.

Figure 29:
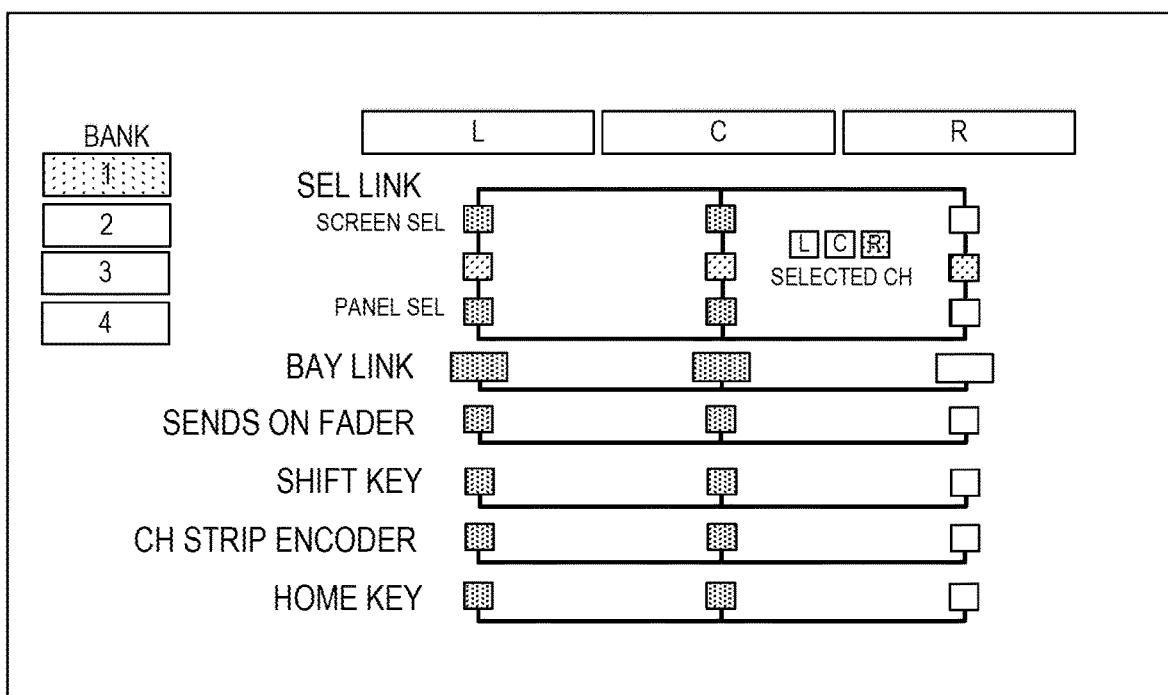
FIG. 29 is a view illustrating an example of the link setting screen.

Next, FIG. 29 is a link setting screen when a bay link is set. The bay link is a function to link faders of the L bay, the C bay, and the R bay. In the example of FIG. 29, the bay links are set in the L bay and the C bay. In this case, the twelve faders 31 in the L bay and the twelve faders 32 in the C bay can be used as one fader block including the 24 faders. Of course, if the bay links are set in the L bay, the C bay, and the R bay, one fader block including 36 faders provided in all the bays can be used.

Further, the bay link of the present embodiment is a function to link the L bay, the C bay, and the R bay collectively. When the bay link is set, all links are valid. In the example of FIG. 29, a link between the first component 550 and the third component 551 is set, and a link between the second component 220 and the fourth component 221 is set. Further, a sends on fader link, a shift key link, a channel strip encoder link, and a home key link are also set between the L bay and the C bay.

The shift key link is a link between the shift keys 650 provided in the respective bays. The shift key link corresponds to synchronization of operations performed by the user on the respective components between the components. For example, if the shift key link is set among the L bay, the C bay, and the R bay, the shift keys 650 in all the bays are pressed when the user presses the shift key 650 in the L bay, the C bay, or the R bay.

The home key link is similar to the shift key. A home key is an operation controller configured to shift a display content of a display to a home screen. For example, if the home key link is set among the L bay, the C bay, and the R bay, the home keys of all the bays are pressed when the user presses the home key of the L bay, the C bay, or the R bay. That is, all of the displays 51, 52, and 53 shift to the home screen.

The channel strip encoder (CH STRIP ENCODER) link is a link among the encoder 413, 423, and 433. If the channel strip encoder link is set, the encoders 413, 423, and 433 are synchronized in the plurality of bays.

The sends on fader link will be described later.

However, the bay link may only link at least two functions. For example, when the bay link is set, the screen SEL and the panel SEL may be only linked. That is, the bay link may only link at least two of the second component 220, the fourth component 221, or the sixth component 222.

The embodiment can be conceptualized as a technical idea as follows.

An operation panel for an audio processing apparatus, which includes a first component (the first component 550 or second component 220) and a second component (the third component 551 or fourth component 221), the operation panel for the audio processing apparatus including a link receiver linking the first component (first component 550 or second component 220) and the second component (third component 551 or fourth component 221), the link receiver linking a plurality of functions (for example, the screen SEL and the panel SEL) in the first component (first component 550 or second component 220) and the second component (third component 551 or fourth component 221), each one function of the plurality of functions being linkable independently, and a batch link setting (bay link) that collectively links at least two functions of the plurality of functions being receivable.

Next, the sends on fader link will be described with reference to FIG. 30. The sends on fader is a mode of causing plurality of faders to temporarily function as operation controllers configured to set a send level for a specific bus. A control (switch) configured to receive the sends on fader is arranged, for example, in the vicinity of the shift key 650 (see, for example, FIG. 9). When the user presses a sends on fader switch and selects a destination output channel, each of the plurality of faders functions as an operation controller to present a first processing parameter indicating a send level from one input channel (or MIX bus) to the selected output channel.

The sends on fader link is a function to link the sends on faders in the L bay, the C bay, and the R bay. In the example of FIG. 30, the sends on fader links are set in the L bay and the C bay. In this case, the 24 faders can be used as faders configured to receive the send levels with respect to specific buses, respectively, for the twelve faders 31 in the L bay and the twelve faders 32 in the C bay. Of course, if the sends on fader links are set in the L bay, the C bay, and the R bay, the 36 faders provided in all the bays can be used as the faders configured to set the send levels with respect to specific buses, respectively.

The audio mixer 10 of the present embodiment can independently set the sends on fader link (a first link mode) and a link of another function (a second link mode: a link between a plurality of components including a user interface that presents a second processing parameter other than the send level).

Figure 30:
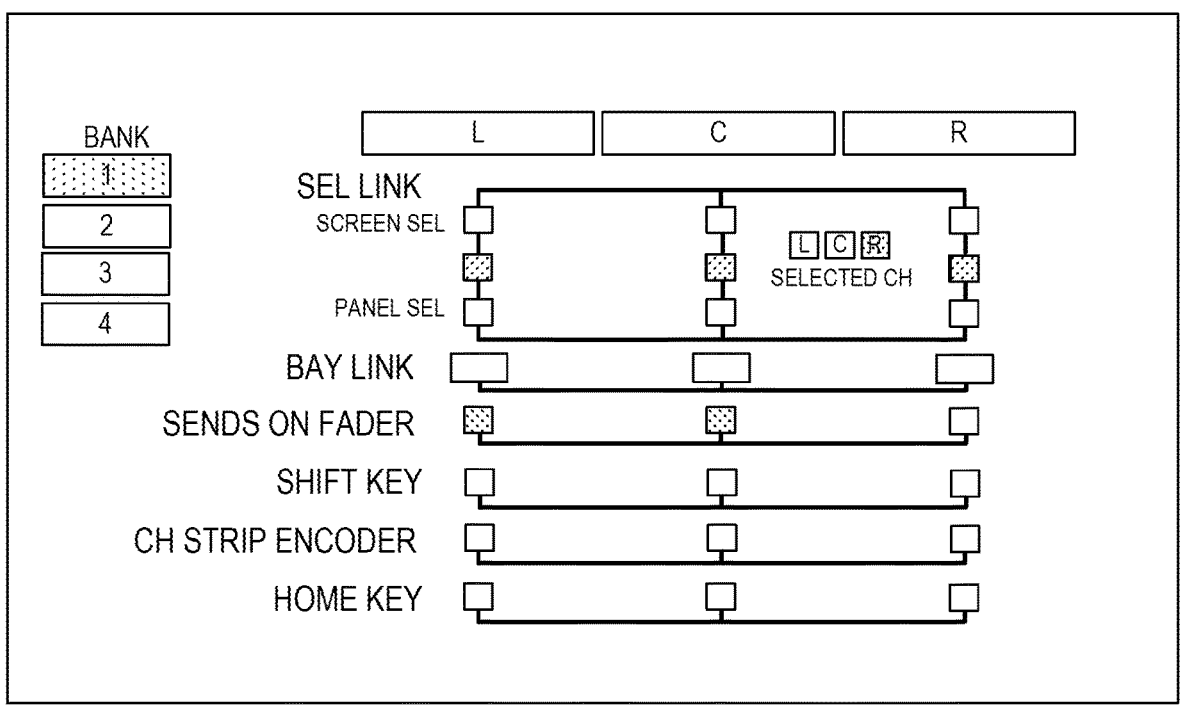
FIG. 30 is a view illustrating an example of the link setting screen.

For example, in FIG. 30, the SEL link is not set, but the sends on fader link is set in the L bay and the C bay. Therefore, basically, the user can use the L bay and the C bay individually. On the other hand, when the user presses the sends on fader switch in the L bay, for example, to set a destination output channel, the sends on faders can be temporarily used with the 24 faders in the L bay and the C bay.

In this manner, the audio mixer 10 of the present embodiment can flexibly set the links among the plurality of (six in the present embodiment) components as compared with a conventional mixing console, and can support various use modes.

In this manner, the audio mixer 10 of the present embodiment can flexibly set the links among the plurality of (six in the present embodiment) components as compared with a conventional mixing console, and can support various use modes.

Note that technical ideas of the link function can be summarized as follows.

(1) An operation panel for an audio processing apparatus including:

a plurality of components including a user interface that selects at least one output channel among a plurality of output channels, and presents a first processing parameter, which indicates a send level from an input channel to the selected output channel, and a second processing parameter different from the first processing parameter; and a link receiver that receives a first link mode for linking the presentation of the first processing parameter and a second link mode for linking the presentation of the second processing parameter, for at least two components among the plurality of components, and is capable of setting the first link mode and the second link mode independently.

(2) An operation panel for an audio processing apparatus including:

a first bay having a first component including at least a display and a second component including at least an operation controller;

a second bay having a third component including at least a display and a fourth component including at least an operation controller;

a plurality of input channels receiving an input of a sound signal and performing signal processing on the input sound signal;

a plurality of output channels receiving an input of a sound signal and performing signal processing on the input sound signal;

a first channel selector selecting one channel among the plurality of input channels or the plurality of output channels and deploying a parameter for signal processing of the selected channel to any component among the first to fourth components;

a second channel selector selecting one output channel among the plurality of output channels;

an assignor assigning the plurality of input channels to the operation controllers; and a link receiver that receives a first link mode for linking the operation controller of the second component and the operation controller of the fourth component as an operation controller, which receives a send level from an input channel assigned to each of the operation controllers by the assignor to the output channel selected by the second channel selector, and a second link mode for linking the first component and the third component and displaying the parameter for signal processing of the channel selected by the first channel selector on each of the display of the first component and the display of the third component, and is capable of setting the first link mode and the second link mode independently.

(3) In the above (2), the link receiver further receives a third link mode for linking the second component and the fourth component for the channel selected by the first channel selector, and is capable of setting the first link mode, the second link mode, and the third link mode independently.

(4) An operation panel for an audio processing apparatus including:

a first bay having a first component including at least a user interface;

a second bay having a second component including at least a user interface;

a third bay having a third component including at least a user interface; and a link receiver linking the first component of the first bay and the third component of the third bay, the first bay and the second bay being adjacent to each other, the second bay and the third bay being adjacent to each other.

(5) In the above (4), each of the first bay, the second bay, and the third bay includes a plurality of components.

(6) An operation panel for an audio processing apparatus including:

a first component;

a second component; and a link receiver linking the first component and the second component, wherein the link receiver links a plurality of functions in the first component and the second component, a link is settable independently for each function of the plurality of functions, and a batch link setting for collectively linking at least two functions of the plurality of functions is received.

(7) In the above (5), the link receiver receives a batch release setting for collectively releasing a link between at least two functions of the plurality of functions for which the link has been set.

(8) In the above (5), when receiving release of a link of one function, the link receiver releases a link of another function in conjunction with the reception.

(9) In the above (5), when receiving release of a link of one function, the link receiver performs only the received release of the link, and does not release a link of another function.

(10) In the above (1), a selected channel section including an operation controller configured to receive a parameter for signal processing of a selected channel is provided, and the link receiver receives a selected channel link for presenting the parameter received in the selected channel section on any component.

It should be considered that the description of the embodiment are merely examples and are not restrictive in all respects. A scope of the present disclosure is indicated by the claims rather than the embodiment described above. Further, the scope of the present disclosure is intended to include all modifications within the meaning and a scope equivalent to the claims.

What is claimed is:

1. A parameter setting apparatus comprising:
a display device;
a first hardware control configured to be operable by a user and comprising one of a knob or a fader;
a mode hardware control configured to be operable by the user and comprising one of a press button, a knob, a switch, or an image displayed on the first display device, which is laminated with a touch panel, the mode operator hardware control configured to permit either designation of:
   a first adjustment mode where the first hardware control functions to adjust a send level to a first selected bus; or
   a second adjustment mode where the first hardware control functions to adjust a first parameter other than the send level to the first selected bus or a second selected bus, the first parameter being selected by the user from among at least one parameter corresponding to a user-custom function defined in advance by the user and stored in a memory; and
a processor configured to:
   control the display device to display a bus selection screen displaying a plurality of buses, including the first selected bus and the second selected bus, on the display device, in a state where the first adjustment mode has been designated;
   select a bus, among the plurality of buses, based on a user operation on the displayed bus selection screen, in the state where the first adjustment mode has been designated;
   cause the first hardware control to adjust:
      the send level of the selected bus, corresponding to the first selected bus, in the state where the first adjustment mode has been designated; and
      the first parameter of the selected bus, corresponding to the first or second selected bus, in a state where the second adjustment mode has been designated.

2. The parameter setting apparatus according to claim 1, wherein the processor controls the display device to:
   display a parameter screen displaying the at least one parameter on the display device, in the state where the second adjustment mode has been designated; and
   receive a user selection of the first parameter from the parameter screen.

3. The parameter setting apparatus according to claim 2, wherein the parameter screen in the state where the second adjustment mode has been designated and the bus selection screen in the state where the first adjustment mode has been designated are displayed in a same area on the display device.

4. The parameter setting apparatus according to claim 1, wherein hardware control receives the designation of the first or second adjustment mode after the first hardware control receives a user operation.

5. The parameter setting apparatus according to claim 1, wherein:
   the display device is a touch panel display, and
   the mode is hardware control comprises part of the touch panel display, which receives user touch operations to designate the first adjustment mode and the second adjustment mode.

6. The parameter setting apparatus according to claim 5, wherein:
   the processor controls the touch panel display to display an image for switching between the first adjustment mode and the second adjustment mode, and
   the touch panel display receives user touch operations on the image to receive the designation of the first adjustment mode and the designation of the second adjustment mode.

7. The parameter setting apparatus according to claim 1, wherein the first hardware control comprises the knob, which is a rotary knob.

8. The parameter setting apparatus according to claim 1, wherein the first hardware control is disposed adjacent to or near an edge of the display device.

9. The parameter setting apparatus according to claim 1, wherein the send level is sent to the selected bus and received from the selected bus.

10. The parameter setting apparatus according to claim 1, further comprising:
   a plurality of display devices, including the display device, and
   a plurality of hardware controls, including the first hardware control, each associated with one of the plurality of display devices.

11. A parameter setting method for a parameter setting apparatus including at least a display device, a first hardware control configured to be operable by a user and comprising one of a knob or a fader, and a mode hardware control configured to be operable by the user and comprising one of a press button, a knob, a switch, or an image displayed on the display device, which is laminated with a touch panel, the method comprising:
receiving, using the mode hardware control, either designation of:
a first adjustment mode where the first hardware control functions to adjust a send level to a first selected bus; or
a second adjustment mode where the first hardware control functions to adjust a first parameter other than the send level to the first selected bus or a second selected bus, the first parameter being selected by the user from among at least one parameter corresponding to a user-custom function defined in advance by the user and stored in a memory;
displaying a bus selection screen displaying a plurality of buses, including the first selected bus and the second selected bus, on the display device, in a state where the first adjustment mode has been designated;
selecting a bus, among the plurality of buses, based on a user operation on the displayed bus selection screen, in the state where the first adjustment mode has been designated;
causing the first hardware control to adjust:
the send level of the selected bus, corresponding to the first selected bus, in the state where the first adjustment mode has been designated; and
the first parameter of the selected bus, corresponding to the first or second selected bus, in a state where the second adjustment mode has been designated.

12. The parameter setting method according to claim 11, further comprising:
controlling the display device to display a parameter screen displaying the at least one parameter on the display device, in the state where the second adjustment mode has been designated; and
receiving a user selection of the first parameter from the parameter screen.

13. The parameter setting method according to claim 12, wherein the parameter screen in the state where the second adjustment mode has been designated and the bus selection screen in the state where the first adjustment mode has been designated are displayed in a same area on the display device.

14. The parameter setting method according to claim 11, wherein the receiving receives the designation of the first or second adjustment mode from the mode hardware control after the first hardware control receives a user operation.

15. The parameter setting method according to claim 11, wherein:
the display device is a touch panel display, and
the mode is hardware control comprises part of the touch panel display, which receives user touch operations to designate the first adjustment mode and the second adjustment mode.

16. The parameter setting method according to claim 15, wherein:
the method further comprises controlling the touch panel display to display an image for switching between the first adjustment mode and the second adjustment mode, and
the touch panel display receives user touch operations on the image to receive the designation of the first adjustment mode and the designation of the second adjustment mode.

17. The parameter setting method according to claim 11, wherein the first hardware control comprises the knob, which is a rotary knob.

18. The parameter setting method according to claim 11, wherein the first hardware control is disposed adjacent to or near an edge of the display device.

19. The parameter setting method according to claim 11, wherein the send level is sent to the selected bus and received from the selected bus.

20. The parameter setting method according to claim 11, wherein the parameter setting apparatus further includes:
a plurality of display devices, including the first display device, and
a plurality of hardware controls, including the first hardware control, each associated with one of the plurality of display devices.

* * * * *